(12) United States Patent
Lippett

(10) Patent No.: US 9,779,042 B2
(45) Date of Patent: Oct. 3, 2017

(54) RESOURCE MANAGEMENT IN A MULTICORE ARCHITECTURE

(71) Applicant: Synopsys, Inc., Mountain View, CA (US)

(72) Inventor: Mark David Lippett, Watlington (GB)

(73) Assignees: Synopsys, Inc., Mountain View, CA (US); Fujitsu Semiconductor Limited, Kanagawa (JP)

( * ) Notice: Subject to any disclaimer, the term of this patent is extended or adjusted under 35 U.S.C. 154(b) by 482 days.

(21) Appl. No.: 13/965,110

(22) Filed: Aug. 12, 2013

(65) Prior Publication Data

US 2014/0025857 A1   Jan. 23, 2014

Related U.S. Application Data

(63) Continuation of application No. 10/816,328, filed on Mar. 31, 2004, now Pat. No. 8,533,716.

(51) Int. Cl.
| | |
|---|---|
| G06F 9/46 | (2006.01) |
| G06F 13/24 | (2006.01) |
| G06F 9/48 | (2006.01) |
| G06F 9/50 | (2006.01) |

(52) U.S. Cl.
CPC ............ G06F 13/24 (2013.01); G06F 9/4812 (2013.01); G06F 9/50 (2013.01)

(58) Field of Classification Search
CPC ........... G06F 9/4812; G06F 9/50; G06F 13/24
See application file for complete search history.

(56) References Cited

U.S. PATENT DOCUMENTS

| | | | |
|---|---|---|---|
| 4,001,783 A | 1/1977 | Monahan et al. | |
| 4,414,624 A | 11/1983 | Summer, Jr. et al. | |
| 5,202,987 A | 4/1993 | Bayer et al. | |
| 5,446,893 A * | 8/1995 | Uehara ................ | G06F 9/4881 711/118 |
| 5,465,335 A * | 11/1995 | Anderson ............. | G06F 9/4843 718/100 |
| 5,504,670 A | 4/1996 | Barth et al. | |

(Continued)

FOREIGN PATENT DOCUMENTS

| | | |
|---|---|---|
| CN | 1347041 A | 5/2002 |
| GB | 2206714 A | 1/1989 |

(Continued)

OTHER PUBLICATIONS

Arison, D. et al., "System Applications of a New 32-Bit Floating-Point DSP Processor," IEEE 1988, 8 pages.

(Continued)

*Primary Examiner* — James J Lee
(74) *Attorney, Agent, or Firm* — Fenwick & West LLP

(57) ABSTRACT

A resource management and task allocation controller for installation in a multicore processor having a plurality of interconnected processor elements providing resources for processing executable transactions, at least one of said elements being a master processing unit, the controller being adapted to communicate, when installed, with each of the processor elements including the master processing unit, and comprising control logic for allocating executable transactions within the multicore processor to particular processor elements in accordance with pre-defined allocation parameters.

16 Claims, 30 Drawing Sheets

(56) References Cited

U.S. PATENT DOCUMENTS

| | | | |
|---|---|---|---|
| 5,592,671 A | | 1/1997 | Hirayama |
| 5,613,128 A | | 3/1997 | Nizar et al. |
| 5,826,081 A | * | 10/1998 | Zolnowsky ........... G06F 9/4843 718/102 |
| 5,987,538 A | | 11/1999 | Tavallaei et al. |
| 5,987,601 A | | 11/1999 | Donovan |
| 6,029,223 A | | 2/2000 | Klein |
| 6,115,763 A | | 9/2000 | Douskey et al. |
| 6,314,501 B1 | | 11/2001 | Gulick et al. |
| 6,370,606 B1 | * | 4/2002 | Bonola ................... G06F 13/24 710/260 |
| 6,427,224 B1 | | 7/2002 | Devins et al. |
| 6,489,974 B1 | | 12/2002 | Johnson et al. |
| 6,496,880 B1 | | 12/2002 | Ma et al. |
| 6,633,942 B1 | | 10/2003 | Balasubramanian |
| 6,662,203 B1 | * | 12/2003 | Kling ................... G06F 9/4881 709/207 |
| 6,820,263 B1 | * | 11/2004 | Klappholz ................ G06F 9/52 718/102 |
| 7,000,092 B2 | | 2/2006 | Gehman et al. |
| 7,047,371 B2 | | 5/2006 | Dortu |
| 7,076,494 B1 | | 7/2006 | Baer et al. |
| 7,146,529 B2 | | 12/2006 | Aguilar, Jr. et al. |
| 7,159,216 B2 | * | 1/2007 | McDonald ............ G06F 9/4881 718/100 |
| 7,401,333 B2 | | 7/2008 | Vandeweerd |
| 7,464,377 B2 | | 12/2008 | Edahiro et al. |
| 7,526,661 B2 | | 4/2009 | Nakajima et al. |
| 7,533,382 B2 | | 5/2009 | Karim |
| 7,886,262 B2 | | 2/2011 | Chew et al. |
| 2002/0087903 A1 | | 7/2002 | Hermerding et al. |
| 2002/0188877 A1 | | 12/2002 | Buch |
| 2003/0005380 A1 | | 1/2003 | Nguyen et al. |
| 2003/0212731 A1 | * | 11/2003 | Brenner ................ G06F 9/5088 718/105 |
| 2004/0006729 A1 | | 1/2004 | Pendurkar |
| 2004/0088501 A1 | | 5/2004 | Collard et al. |
| 2004/0153650 A1 | | 8/2004 | Hillmer |
| 2004/0199632 A1 | | 10/2004 | Romero et al. |
| 2005/0125580 A1 | | 6/2005 | Madukkarumukumana et al. |
| 2005/0154860 A1 | | 7/2005 | Arimilli et al. |
| 2005/0203988 A1 | | 9/2005 | Nollet et al. |

FOREIGN PATENT DOCUMENTS

| | | |
|---|---|---|
| JP | 03-138753 A | 6/1991 |
| JP | 7-295840 A | 11/1995 |
| JP | 2001-306323 | 11/2001 |
| KR | 10-1997-0059923 | 8/1997 |
| KR | 10-0170506 B1 | 3/1999 |
| KR | 10-0376056 B1 | 3/2003 |
| TW | 200403588 A | 3/2004 |
| WO | WO 02/46887 A2 | 6/2002 |
| WO | WO 2004/019206 A1 | 3/2004 |

OTHER PUBLICATIONS

Cesario, W. et al., "Component-Based Design Approach for Multicore SoCs," Jun. 10-14, 2002, ACM, DAC 2002, 6 pages.

Mooney, V.J. III, "A Hardware-Software Real-Time Operating System Framework for SoCs," IEEE Design & Test of Computers, Nov.-Dec. 2002, pp. 44-51.

Ignios White Paper, "Unlocking the potential of software-programmable multi-core chips," Apr. 2003, pp. 1-5, Ignios Ltd.

European Examination Report, European Application No. 05729094.2, dated Feb. 20, 2012, 5 pages.

Indian Office Action, Indian Application No. 3568/CHENP/2006, dated May 10, 2012, 2 pages.

Japanese Office Action, Japanese Application No. 2007-505624, dated Jan. 4, 2011, 9 pages.

Japanese Office Action, Japanese Application No. 2007-505624, dated Apr. 3, 2012, 3 pages.

Japanese Final Office Action, Japanese Application No. 2007-505624, dated Dec. 4, 2012, 8 pages.

Kasahara, H. et al., "Parallel Processing of Near Fine Grain Tasks Using Static Scheduling on OSCAR (Optimally Scheduled Advanced Multiprocessor)," IEEE Comp. Soc. Press Proceedings of the Supercomputing Conference, Nov. 12-16, 1990, pp. 856-864, vol. Conf. 3.

Korean First Office Action, Korean Application No. 10-2006-7022736, dated May 29, 2011, 2 pages.

Korean Second Office Action, Korean Application No. 10-2006-7022736, dated Apr. 26, 2012, 3 pages.

Korean Notice of Allowance, Korean Application No. 10-2012-7020977, dated Nov. 29, 2012, 3 pages.

Korean Office Action, Korean Application No. 10-2011-7028576, dated Feb. 9, 2012, 2 pages.

Korean Notice of Allowance, Korean Application No. 10-2011-7028576, dated Dec. 27, 2012, 3 pages.

McCann, C. et al., "A Dynamic Processor Allocation Policy for Multiprogrammed Shared-Memory Multiprocessors," Journal of ACM Transactions on Computer Systems, May 1993, pp. 146-178, vol. 11, No. 2.

PCT International Search Report and Written Opinion, PCT Application No. PCT/GB2005/001154, dated Aug. 12, 2005, 13 pages.

Taiwan Office Action, Taiwan Application No. 094110344, dated Sep. 14, 2012, 16 pages.

Torii, M. et al., "Programming Model and Evaluation of Ordered-Multithreading Architecture," Papers of the Information Processing Society of Japan, Information Processing Society of Japan, Sep. 15, 1997, pp. 1706-1716, vol. 38, No. 9.

Ueng, J-C. et al., "Multi-Threaded Design for a Software Distributed Shared Memory System," IEICE Transactions on Information and Systems, Dec. 1999, pp. 1512-1523, vol. E82-D, No. 12.

Indian Third Examination Report, Indian Application No. 3568/CHENP/2006, dated Apr. 16, 2013, 1 page.

Indian Second Examination Report, Indian Application No. 3568/CHENP/2006, dated Jan. 2, 2013, 1 page.

Korean Notice of Allowance, Korean Application No. 10-2006-7022736, dated Jan. 25, 2013, 3 pages.

U.S. Office Action, U.S. Appl. No. 10/816,328, dated Apr. 14, 2008, 22 pages.

U.S. Office Action, U.S. Appl. No. 10/816,328, dated Oct. 16, 2008, 24 pages.

U.S. Office Action, U.S. Appl. No. 10/816,328, dated Apr. 22, 2009, 27 pages.

U.S. Office Action, U.S. Appl. No. 10/816,328, dated Nov. 9, 2009, 26 pages.

U.S. Office Action, U.S. Appl. No. 10/816,328, dated Aug. 3, 2010, 29 pages.

U.S. Office Action, U.S. Appl. No. 10/816,328, dated Nov. 22, 2010, 27 pages.

U.S. Office Action, U.S. Appl. No. 10/816,328, dated Apr. 23, 2012, 30 pages.

U.S. Office Action, U.S. Appl. No. 13/965,113, dated Feb. 19, 2016, 15 pages.

U.S. Office Action, U.S. Appl. No. 13/965,113, dated Apr. 20, 2016, 16 pages.

U.S. Office Action, U.S. Appl. No. 13/965,113, dated Jan. 12, 2017, 18 pages.

U.S. Office Action, U.S. Appl. No. 13/965,113, dated Oct. 25, 2016, 19 pages.

* cited by examiner

| WORD | BIT | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | | | | | | | | | | | | | | | | | | | | | | | | | | | | | | | | |
| 1 | | | | | | | | | | | | | | | | | | | | | | | | | | | | | | | | |
| 2 | | | | | | | | | | | | | | | | | | | | | | | | | | | STATUS | | | | | |
| 3 | METRIC [1] | | | | | | | | | | | | | | | | | | | | | | | | | | | | | | | |
| 4 | METRIC [0] | | | | | | | | | | | | | | | | | | | | | | | | | | | | | | | |
| 5 | pREFERENCE | | | | | | | | | | | | | | | | | | | | | | | | | | | | | | | |
| 6 | NEXT INDEX [1] | | | | | | | | | | | | | | | | | NEXT INDEX [0] | | | | | | | | | | | | | | |
| 7 | PREVIOUS INDEX [1] | | | | | | | | | | | | | | | | | PREVIOUS INDEX [0] | | | | | | | | | | | | | | |

FIGURE 9A

| FIELD | TYPE | DESCRIPTION |
|---|---|---|
| STATUS.TYPE | UNSIGNED NIBBLE | DETERMINES THE TYPE OF THE WME |
| STATUS.FLAGS | bool[] | TYPE SPECIFIC WME FLAGS |
| METRIC[1:0] | UNSIGNED LONG[] | SCHEDULER METRICS |
| pREFERENCE | (VOID*) | A POINTER TO A THREAD CONTROL BLOCK WITHIN SYSTEM MEMORY |
| NextIndex[1:0] | UNSIGNED SHORT[] | TWO FORWARD POINTERS FOR AUTONOMOUS LINKED LISTS |
| PreviousIndex[1:0] | UNSIGNED SHORT[] | TWO BACKWARD POINTERS FOR AUTONOMOUS LINKED LISTS |

FIGURE 9B

| WORD \ BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | colspan="16" | DEPENDENCY REFERENCE ||||||||||||||||| colspan="16" | |||||||||||||||
| 1 | colspan="32" | DEPENDENCY TIMEOUT |||||||||||||||||||||||||||||||
| 2 | colspan="16" | SCHEDULER TIER ID ||||||||||||||||| colspan="16" | PENDINGQUEUED |||||||||||||||
| 3 | colspan="32" | METRIC [1] |||||||||||||||||||||||||||||||
| 4 | colspan="32" | METRIC [0] |||||||||||||||||||||||||||||||
| 5 | colspan="24" | pREFERENCE ||||||||||||||||||||||||| colspan="8" | STATUS |||||||
| 6 | colspan="16" | NEXT INDEX [1] ||||||||||||||||| colspan="16" | NEXT INDEX [0] |||||||||||||||
| 7 | colspan="16" | PREVIOUS INDEX [1] ||||||||||||||||| colspan="16" | PREVIOUS INDEX [0] |||||||||||||||

FIGURE 9C

| FIELD | TYPE | DESCRIPTION |
|---|---|---|
| DEPENDENCY REFERENCE | (void*) | OPTIONAL POINTER TO A SYNCHRONIZATION PRIMITIVE (MUTEX, SEMAPHORE etc.) UPON WHICH THIS THREAD IS DEPENDENT. |
| DEPENDENCY TIMEOUT | UNSIGNED LONG | OPTIONAL TIMEOUT FOR SYNCHRONIZATION BASED ON TEMPORAL STATE. |
| SCHEDULER TIER ID | UNSIGNED SHORT | INDEX OF WEAVER 1 MEMORY ELEMENT CONTAINING THE PARENT SCHEDULER TO WHICH THE SYNCHRONIZATION IS QUEUED. |
| STATUS.TYPE | UNSIGNED NIBBLE | SET TO 1. |
| STATUS.FLAGS | bool[] | WORK QUEUE STATUS FLAGS DETERMINING THE FOLLOWING STATUS:<br>0: PUSHED (THREAD HAS BEEN PUSHED INTO SCHEDULER QUEUE)<br>1: POPPED (THREAD HAS BEEN POPPED FROM SCHEDULER QUEUE)<br>2: DISPATCHED (THREAD HAS BEEN DISPATCHED) |
| METRIC[1:0] | UNSIGNED LONG[] | SCHEDULER METRICS |
| pREFERENCE | (VOID*) | A POINTER TO A THREAD CONTROL BLOCK WITHIN SYSTEM MEMORY |
| NextIndex[1:0] | UNSIGNED SHORT[] | TWO FORWARD POINTERS FOR AUTONOMOUS LINKED LISTS |
| PreviousIndex[1:0] | UNSIGNED SHORT[] | TWO BACKWARD POINTERS FOR AUTONOMOUS LINKED LISTS |

FIGURE 9D

| WORD \ BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | colspan="16" | HEAD INDEX |||||||||||||||| colspan="16" | NUMBER OF ELEMENTS ||||||||||||||||
| 1 | colspan="16" | PARENT INDEX |||||||||||||||| colspan="16" | TOTAL THREAD ELEMENTS ||||||||||||||||
| 2 | colspan="4" | SCHED PUSH OP |||| colspan="4" | SCHED POP OP |||| colspan="4" | METRIC PUSH OP |||| colspan="4" | METRIC POP OP |||| colspan="8" | BUNDLE LIMIT |||||||| colspan="8" | STATUS ||||||||
| 3 | colspan="16" | METRIC [1] ||||||||||||||||| | | | | | | | | | | | | | | | |
| 4 | colspan="16" | METRIC [0] ||||||||||||||||| | | | | | | | | | | | | | | | |
| 5 | colspan="16" | pREFERENCE ||||||||||||||||| | | | | | | | | | | | | | | | |
| 6 | colspan="16" | NEXT INDEX [1] |||||||||||||||| colspan="16" | NEXT INDEX [0] ||||||||||||||||
| 7 | colspan="16" | PREVIOUS INDEX [1] |||||||||||||||| colspan="16" | PREVIOUS INDEX [0] ||||||||||||||||

FIGURE 9E

| FIELD | TYPE | DESCRIPTION |
|---|---|---|
| HEAD INDEX | UNSIGNED SHORT | THE HEAD INDEX OF THE UNDERLYING QUEUE STRUCTURE. |
| NUMBER OF ELEMENTS | UNSIGNED SHORT | THE NUMBER OF ELEMENTS IN THE IMMEDIATELY UNDERLYING QUEUE STRUCTURE. |
| PARENT INDEX | UNSIGNED SHORT | POINTER TO THE PARENT SCHEDULER TIER OR DISPATCH QUEUE. |
| TOTAL THREAD ELEMENTS | UNSIGNED SHORT | THE TOTAL NUMBER OF THREAD ELEMENTS IN THE UNDERLYING QUEUE STRUCTURE (i.e. EXCLUDING SCHEDULER TIERS) |
| SCHEDULER PUSH OPERATOR | UNSIGNED CHAR | OPERATOR TO BE EXECUTED WHEN A THREAD IS PUSHED ONTO THE SCHEDULER TIER. |
| SCHEDULER POP OPERATOR | UNSIGNED CHAR | OPERATOR TO BE EXECUTED WHEN A THREAD IS POPPED FROM THE SCHEDULER TIER. |
| METRIC PUSH OPERATOR | UNSIGNED CHAR | SCHEDULER METRIC PROPAGATION OPERATOR FOR EXECUTION WHEN A THREAD IS PUSHED ONTO THE SCHEDULER TIER. |
| METRIC POP OPERATOR | UNSIGNED CHAR | SCHEDULER METRIC PROPAGATION OPERATOR FOR EXECUTION WHEN A THREAD IS POPPED FROM THE SCHEDULER TIER. |
| PARENT INDEX | UNSIGNED SHORT | POINTER TO THE PARENT SCHEDULER TIER OR DISPATCH QUEUE |
| BUNDLE LIMIT | UNSIGNED CHAR | INDEX OF WEAVER 1 MEMORY ELEMENT CONTAINING THE PARENT SCHEDULER TO WHICH THE SYNCHRONIZATION IS QUEUED. |
| STATUS.TYPE | UNSIGNED NIBBLE | SET TO: 2: DYNAMIC SCHEDULER TIER 3: LOCKED DYNAMIC SCHEDULER TIER 4: STATIC SCHEDULER TIER 5: ROOT SCHEDULER TIER |
| STATUS.FLAGS | bool[] | UNUSED |
| METRIC[1:0] | UNSIGNED LONG[] | SCHEDULER METRICS |
| pREFERENCE | (VOID*) | USED WITHIN DYNAMIC SCHEDULER TIERS TO IDENTIFY THE FINAL THREAD ELEMENT OF THE TIER. |
| PreviosIndex[1] NextIndex[1:0] | UNSIGNED SHORT[] | SUB-BLOCK WORK QUEUE LIST POINTERS. |
| PreviousIndex[1:0] NextIndex[0] | UNSIGNED SHORT[] | DUAL ATTACHED LINKED LIST FOR SCHEDULER PEERS. |

FIGURE 9F

| WORD | BIT | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | PREEMPTION PRIORITY | | | | | | | | | | | | | | | | ROOT SCHEDULER INDEX | | | | | | | | | | | | | | | |
| 1 | NUMBER OF ELEMENTS | | | | | | | | | | | | | | | | HEAD INDEX | | | | | | | | | | | | | | | |
| 2 | FULL DEPTH | | | | | | | | | PROC ELEMENT ID | | | | | | | | | | | | | | | | | | | | | | |
| 3 | | | | | | | | | | | | | | | | METRIC [1] | | | | | | | | | | | | | | | | |
| 4 | | | | | | | | | | | | | | | | METRIC [0] | | | | | | | | | | | | | | STATUS | | |
| 5 | NEXT INDEX [1] | | | | | | | | | | | | | | | | | | | | | | NEXT INDEX [0] | | | | | | | | | |
| 6 | PREVIOUS INDEX [1] | | | | | | | | | | | | | | | | | | | | | | PREVIOUS INDEX [0] | | | | | | | | | |
| 7 | | | | | | | | | | | | | | | | | | | | | | | | | | | | | | | | |

FIGURE 9G

| FIELD | TYPE | DESCRIPTION |
|---|---|---|
| PREEMPTION PRIORITY | UNSIGNED SHORT | PRIORITY OF THE CURRENTLY EXECUTING THREAD. USED TO AVOID PRIORITY INVERSION. |
| ROOT SCHEDULER INDEX | UNSIGNED SHORT | INDEX OF THE MEMORY ELEMENT CONTAINING THE ROOT SCHEDULER AT THE HEAD OF THE SCHEDULING CONE FOR THIS RESOURCE. |
| NUMBER OF ELEMENTS | UNSIGNED SHORT | THE NUMBER OF THREAD ELEMENTS CURRENTLY HELD WITHIN THE DISPATCH QUEUE. |
| HEAD INDEX | UNSIGNED SHORT | THE HEAD INDEX OF THE DISPATCH QUEUE. |
| STATUS.TYPE | UNSIGNED NIBBLE | SET TO 6. |
| STATUS.FLAGS | bool[] | WORK QUEUE STATUS FLAGS. |
| METRIC[1] | UNSIGNED LONG | POWER DOWN ELIGIBILITY COUNTER. |
| METRIC[0] | UNSIGNED LONG | POWER DOWN ELIGIBILITY THRESHOLDS. |
| PreviousIndex[1] NextIndex[1] | UNSIGNED SHORT[] | SUB-BLOCK WORK QUEUE LIST POINTERS. |
| PreviousIndex[0] NextIndex[0] | UNSIGNED SHORT[] | INTER DISPATCH QUEUE LIST POINTERS. |

FIGURE 9H

| FIELD | TYPE | DESCRIPTION |
|---|---|---|
| HEAD INDEX | UNSIGNED SHORT | POINTER TO THE HEAD INDEX OF THE PENDING LIST. |
| NUMBER OF ELEMENTS | UNSIGNED SHORT | NUMBER OF PENDING LIST ELEMENTS. |
| STATUS.TYPE | UNSIGNED NIBBLE | SET TO 7. |
| STATUS.FLAGS | bool[] | UNUSED |
| PreviousIndex[0] NextIndex[0] | UNSIGNED SHORT[] | INTER PENDING QUEUE LIST POINERS. |

FIGURE 9J

| FIELD | TYPE | DESCRIPTION |
|---|---|---|
| DEPENDENCY TIMEOUT | UNSIGNED LONG | TIMEOUT FOR COMPARISON WITH THE THREAD CURRENTLY BEING INSERTED |
| TYPE | UNSIGNED CHAR | SET TO 8. |
| FLAGS | bool[] | UNUSED |
| METRIC[1:0] | UNSIGNED LONG[] | SCHEDULER METRICS |
| NextIndex[1:0] | UNSIGNED SHORT[] | TWO FORWARD POINTERS FOR AUTONOMOUS LINKED LISTS. |
| PreviousIndex[0] | UNSIGNED SHORT[] | TWO BACKWARD POINTERS FOR AUTONOMOUS LINKED LISTS. |

FIGURE 9L

RESOURCE MANAGEMENT IN A MULTICORE ARCHITECTURE

CROSS REFERENCE TO RELATED APPLICATIONS

This application is a continuation of U.S. application Ser. No. 10/816,328, filed Mar. 31, 2004, now issued as U.S. Pat. No. 8,533,716, which is incorporated by reference in its entirety.

BACKGROUND OF THE INVENTION

Field of the Invention

This invention relates to a method and apparatus for resource management in a multicore architecture.

Description of the Related Art

Today, semiconductor devices incorporating complex heterogeneous multicore architectures are put to use in a wide variety of systems and devices, from the ubiquitous desktop computer, to the latest in modern electronic devices, such as mobile telephones, Personal Digital Assistants and high speed telecoms or network switching equipment.

Whatever the intended use of any computer processor, the processor manufacturers continue to strive to increase the performance of current processors, whilst maintaining or reducing their unit "cost".

The "cost" of a processor can be measured using a variety of parameters. Although in many cases, the cost will be a purely financial one, in many applications, especially in the embedded processor market, the cost calculation also includes ancillary considerations such as power consumption, cooling requirements, efficiency and time to bring to market.

The absolute capacity for any processor to perform useful functions may be characterised in terms of the MIPS (millions of instruction per second) ratio achievable, and thus the "price-performance" ratio of any processor may be characterised in terms of the MIPS/mm$^2$, MIPS/$, or MIPS/mW, for example.

In practice however, not all instructions achieve the same amount of useful work, therefore "pure" MIPS ratings are not easily comparable. Thus, while a Digital Signal Processor (DSP) is well suited to solving the mathematically intensive processing near the wireless interface of a mobile phone, it is very inefficient at running the web browser that runs on the phone's screen. Effectively this means that processors can be more usefully classified in terms of "application available" price-performance.

Furthermore, an additional reduction in the effective performance can be caused by the inefficiency of the programming, i.e. software, tools that must be used to control and customise the processor to implement a particular application. The final level of performance that can be extracted from a processor for a particular application can thus be viewed as the level of usable or "achievable application available" price-performance.

In the semiconductor companies' drive to improve processor application available price-performance, a new class of processor, the multicore device, has been developed. Multicore devices are highly integrated processors that are built from a variety of elements (cores), each of which may be highly specialised, in order to provide the maximum level of useful price performance for a particular aspect of an application that can be executed by the processor. Such devices may be "heterogeneous", i.e. incorporating multiple, dissimilar cores, or "homogenous", i.e. incorporating multiple similar cores.

Most multicore devices may also be classified as System on Chip (SoC) devices, since the integration includes not only the multiple processing cores, but also the memory, IO and other system "cores" that are required to handle most (if not all) of the hardware requirements for any particular product. Although not all SoC devices have multiple processing cores, the terms multiple core and SoC are often interchanged. A good example of a multicore SoC can be found in many mobile phones, where one will find a single processor containing one or more DSPs to run the wireless interface, and a general purpose processor to run the user applications on the phone.

The emergence of multicore devices has been enabled by Moore's Law, which states that the number of transistors that can be fitted into any given area of silicon will double every 18 months due to improvements in the manufacturing process. Moore's Law therefore allows for more individual transistors to be fitted into any given area on the silicon die, making it technically and economically viable to manufacture ever more complex devices on a single piece of silicon. Equally, by reducing the size of the transistors, they are capable of being switched at ever higher speeds.

Historically, Moore's Law was used to manufacture a new generation of processors at smaller sizes which were faster or more cost effective in terms of silicon used, without any major changes to the underlying architecture (i.e. the improvements were improvements in manufacturing process and the device's physical micro-architecture rather than of device's logical macro-architecture).

Effectively, the trend towards multicore/SoC processors can be seen as a macro-architectural shift to higher levels of integration which first started with the introduction of IO (communications) functionality onto the silicon die itself; now the IO, the memory, and the functionality of multiple processing units, DSPs and co-processors can be integrated onto the same silicon die. These processors should reduce the manufacturing costs of end products by providing the lowest cost, highest performing processor for a particular class of application. Also, by integrating most of the system components onto a single processor, the part count can be reduced, therefore increasing reliability and lowering power consumption.

A key problem is how the use of the underlying hardware in such multicore devices can be optimised, in order to achieve the highest possible "application available" price-performance.

There are many ways in which processor and system designers may leverage parallelism within the application software (application level parallelism), and within the instruction stream (instruction level parallelism). The various manifestations differ in where the parallelism is managed and whether it is managed when the system is executing/at "run-time" (dynamic systems), or when the application software is being compiled/at compile time (static systems). In practice, the partition between dynamic and static systems and hardware intensive and software intensive solutions is not distinct and techniques from one discipline are often borrowed by the other.

At the level of the individual processing core, the concept of multiple issue processors, or machines which operate on many instructions from a single stream in parallel, is well established in the art. They come in two basic types; superscalar and Very Long Instruction Word (VLIW) processors. Superscalar processors issue varying numbers of instructions per clock cycle identified either at run-time (dynamically scheduled) or at compile time (statically scheduled). VLIW processors issue a fixed number of instructions, forming a very long instruction word, as defined by the compiler. Typically, the programmer is completely unaware of this process as the programming model of the system is a standard, single processor abstraction.

Super-threading and Hyper-threading are both technologies which emulate multiple processors by multiplexing multiple threads of execution amongst multiple virtual processors. Typically, these virtual processors share certain resources which, statistically, would not be used by a single thread all of the time. Super and Hyper-threading architectures appear as multiple independent processors and therefore require a level of application parallelism to be present in order to work efficiently. Typically hardware limitations in the processor core limit the number of threads which may be supported to substantially less than 100.

Furthermore, several system-architectural options exist for the exploitation of the inherent parallelism in many applications. Multiple Instruction Multiple Data (MIMD) machines, where each processor executes its own instructions and operates on its own set of data whilst cooperating with its peers through some shared resource (for example memory and/or interconnect), have become popular due their ability to address a wide variety of applications.

As performance demands increase, embedded systems are increasingly making use of multicore MIMD architectures, using multiple dissimilar or similar processing resources, to deliver the required level of silicon efficiency. Typically, these are a class of MIMD machine called centralised shared memory architectures, i.e. a single address space (or a proportion thereof) is shared amongst the multiple processing resources, although more application specific hybrid architectures are also commonly found.

Although each processing resource of a MIMD array may exploit Instruction Level Parallelism (ILP), MIMD machines may also take advantage of Thread Level Parallelism (TLP) to realise the potential performance of the underlying hardware. In contrast to ILP, which is identified at run-time (by specific hardware) or compile-time (by optimising compile tools), TLP is defined within high-level programming software at application design time.

Threading is a concept that has been used within the software community for many years, as a high level expression of parallelism. A thread defines an autonomous package of work containing an execution state, instruction stream and dataset, which, by definition, may execute concurrently with other threads. The complexity of the instruction stream is unimportant. A thread may describe anything from a simple transfer of data to a complex mathematical transform.

Traditionally, operating systems have assisted in the provision of system management, including thread allocation functions, which enable an application to be run on a certain configuration of a multicore architecture without the software engineer requiring detailed understanding of the underlying device architecture. However, existing software techniques for thread management within a uni-core device cannot be readily adapted to multicore architectures in a consistent way. Solutions to date have been proprietary, requiring bespoke solutions on a design by design basis and have typically compromised performance and scalability.

Historically, in the case of heterogeneous multi-core systems (that is, systems having broadly dissimilar processing resources), many varying approaches have been employed to enable the disparate processing resources to work together. However, broadly these may be split into two categories, "proxy host" and "co-operative" (also known as "peer to peer"). In the former case, a designated general purpose host processor (which in a bus-based system is often referred to as a CPU) governs the system overall, brokering tasks across the system and synchronising access to resources such as memory and devices. Such system supervision is typically operated in an operating system kernel and competes for slices of time with the system application and the processing of asynchronous events on the host processor. In other words, this general purpose processor must act as a centralised proxy thread manager for all the processing resources on the multicore device, as well as act as a key application processor.

When used in this configuration, the general processor must maintain queues of threads ready for execution for each processing resource, depending on a predefined scheduling policy, i.e. their priority (i.e. dispatch or ready queues), as well as queues of threads awaiting some event, or the return of another thread's results, before they can themselves start to be executed (i.e. pending and timing queues). These are in addition to other system overheads, such as processor configuration prior to thread execution.

Whenever the general purpose processor diverts its processing time from a thread it is currently executing, to the administration of the system (including thread management), for example, as a result of an interrupt issued due to the completion of a thread (and therefore the freeing up of the processing resource that has just completed that thread), the general processor must make a context change.

A context change involves storing the current progress of the thread being halted into memory, fetching instructions relevant to the administration routines for the servicing of the other threads/processing resources, then carrying out those instructions, including any configuration requirements. A further context change must be carried out to return to the original, halted thread. These context changes are typically executed on receipt of an interrupt, and in embedded systems, these interrupts are often both frequent and asynchronous to the application code executing on the general purpose processor. Therefore, the system as a whole exhibits significant degradation of performance. Context switches also have a negative impact upon the effectiveness of host processor caches (the so-called "cold-cache" effect)

In the case of a co-operative system, each processing resource runs a separate instance of an operating system, part of which enables inter-resource communications. Such an arrangement accordingly has a relatively rigid architectural partitioning, as a result of a specific routing of interrupts between peers. Although this type of system offers the primitives required to produce an application, the performance of the implementation still suffers from frequent context switches associated with operating system kernel activity.

In summary, current designs and methodologies for the realisation of system management in traditional architectures (general purpose processors, software executives etc.) are inappropriate for the system and thread management of complex heterogeneous multi-core architectures. Indeed the general purpose processor is poorly optimised at both the micro (instruction set) and a macro (caches, register file management) architectural level. Although the interconnect of a multicore processor provides a physical medium for interoperation between the separate processing resources, there is no system wide task management and communication layer shared amongst all the processing resources enabling a coherent approach to system management. In the worst case this may lead to a distinct problem associated with every possible communication channel between every processing resource, each of which must be traditionally separately solved in software on an ad-hoc basis.

Thus, there is a need for an efficient method of system management of these very complex multicore architectures. Software abstraction alone cannot provide the requisite level of performance of complex multicore architectures.

SUMMARY OF THE INVENTION

According to a first aspect of the present invention, there is provided a resource management and task allocation controller for a multicore processor as defined in claim 1.

In a preferred embodiment, the controller of claim 1 is dedicated to resource management and task allocation and does not provide further processing resources.

By providing a separate resource management and task allocation controller, the invention provides an improved task allocation and management system for a multicore processor, enabling the more efficient allocation of tasks between the available processing resources. The controller abstracts the elements of system management and exception handling into a dedicated, efficient, hard-coded embodiment.

Embodiments of the invention employ controller clients along with the controller, rather than enforcing the role of a "proxy agent". The controller clients may be implemented in hardware or software. Such an arrangement efficiently masters the "run-time" activities of the underlying system. In particular, the controller continually ("greedily") maintains the correctness of the system thread states and scheduling decisions based upon the range of pre-defined allocation parameters.

The architecture of preferred embodiments accordingly provides significant benefits in terms of the division of work between the constituent components and the autonomy of individual processing resources, regardless of complexity. All processing resources become slave devices, which are by default "lazy", i.e. they wait to be explicitly instructed by the resource management and task allocation controller to perform tasks, via, in preferred embodiments, dedicated interrupts.

In systems employing the controller of the present invention, all asynchronous events instigated from outside the architecture, either directly through a pin or indirectly through external manipulation of one of the processing resources (i.e. an IO device), are in preference routed to the controller, where they are compared using a set of scheduling policies, configured at "boot-time", with the currently executing task on the target processing resource. The processing resource is only interrupted if an interrupt service thread (IST) associated with the external event presides over the currently executing transaction (thread or task), thereby obviating unnecessary context switching in any processing resource as was a problem in the art. Furthermore, the controller clients of preferred embodiments enable processing resources of arbitrary complexity to perform basic system management operations on shared resources and the controller itself (create thread, issue synchronisation primitive, delete thread, memory copy etc), avoiding the need for an instruction set based machine to execute these tasks by proxy.

In a further aspect of the invention, there is provided a multicore processor comprising such a controller.

The invention also extends to a method of controlling and allocating resources in a multicore processor.

Further advantageous and features are defined in the dependent claims appended hereto.

BRIEF DESCRIPTION OF THE DRAWINGS

The present invention may be put into practise in a number of ways, and some embodiments will now be described by way of example only and with reference to the accompanying drawings, in which:

FIGS. 9a and 9b show a generic descriptor and its associated fields;

FIGS. 9c and 9d show a thread descriptor and its associated fields;

FIGS. 9e and 9f show a scheduler tier descriptor and its associated fields;

FIGS. 9g and 9h show a dispatch queue descriptor and its associated fields

FIGS. 9i and 9j show a pending queue descriptor and its associated fields;

FIGS. 9k and 9l show a skip list descriptor and its associated fields;

DETAILED DESCRIPTION

Figure 1:
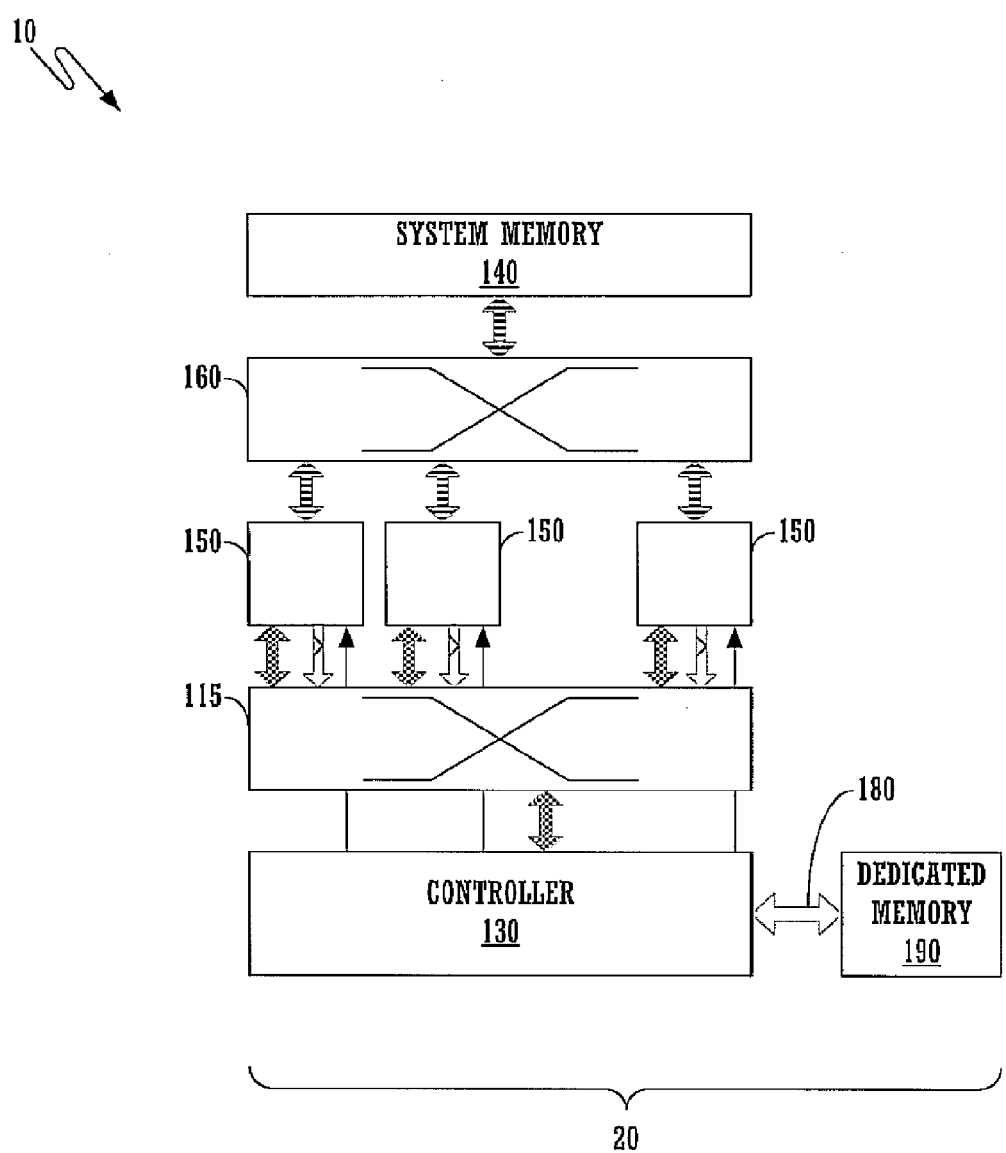
FIG. 1 shows a schematic block diagram of the logical layout of system incorporating a resource management and task allocation controller in accordance with an embodiment of the present invention.

FIG. 1 shows a logical view of a system framework 10 incorporating features that are in accordance with an embodiment of the present invention. The framework 10 comprises a plurality of processing resources 150, each of which may be similar or dissimilar to others of the processing resources 150, and each of which may be of arbitrary complexity. Each processing resource shares access to a common system memory 140 where shared data is stored via an interconnect 160. It will be understood that not all system memory 140 is necessarily common to all processing resources 150, of course.

The system framework also comprises a centralised task allocation and management system 20 in accordance with an embodiment of the present invention. The centralised task allocation and management system 20 includes a system management controller 130 and a dedicated tightly coupled memory interface 180, connected to a dedicated tightly coupled memory 190. Each processing resource 150 is able to access the controller 130 via an interconnect 115. It is to be understood that no particular interconnection strategy (that is, the arrangement by which the controller 130 communicates with each processing resource 150 and vice versa, and the arrangement by which each processing resource 150 communicates with the system memory 140) is required in the implementation of the arrangement of FIG. 1; in particular, point to point links, a central system bus or even a pipelined architecture may equally be employed, save only that each of the processing resources should be able to communicate directly or indirectly (i.e. via other processing resources or otherwise) with the controller 130.

Figure 2:
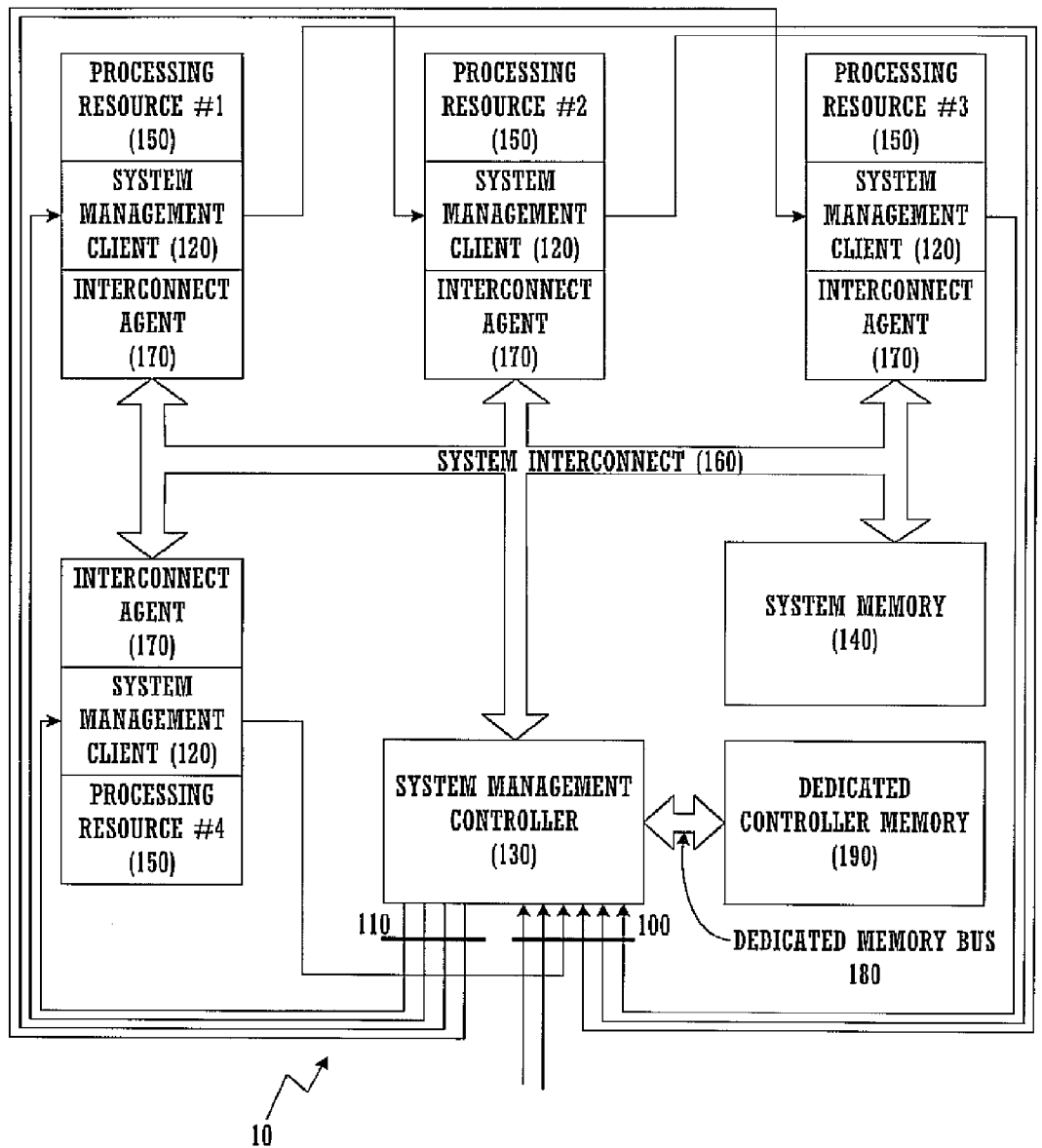
FIG. 2 shows a schematic block diagram of one exemplary implementation of the logical layout of FIG. 1, wherein the controller embodying the present invention is incorporated within a general purpose, multicore processor architecture, along with a dedicated memory device and a controller client.

FIG. 2 shows a multicore processor implementing the logical arrangement of FIG. 1, again by way only of an example. The multicore processor of FIG. 2 employs a plurality of the processing resources 150, each connected via a system interconnect 160. In one embodiment, at least one of the plurality of processing resources 150 is a master processing unit. The system interconnect 160 communicates in turn with the system management controller 130 via input interfaces 100, and output interfaces 110. In the example of FIG. 2 the system interconnect 160 is laid out as a traditional central bus which connects each of the processing resources 150 with one another and with the controller 130, and also with the shared system resources such as a system memory 140. Interfacing with the memory 140 may be achieved via any one of a number of currently available interface technologies. The memory may consist of any of the currently available central computer memory technologies, for example Static Random Access Memory (SRAM), or Double Data Rate Random Access Memory (DDR RAM).

As seen in FIG. 2, each of the multiple processing resources 150 has an associated system management controller client 120 configured to receive control information from the central controller 130, and to administer the processing resources 150 in accordance with the control information received. The function and purpose of the controller clients 120 is described in more detail in connection with FIGS. 7 and 8 below. Each processing resource also has an associated interconnect agent 170 for communication with the controller 130 via the system interconnect 160. The interconnect agent 170 provides a generic interface to the controller client 120, which is independent of the underlying interconnect protocol in use on the system interconnect 160, i.e., it provides protocol translation between the communication protocols in use on the system interconnect 160 and the communication protocol in use by the controller client 120. Due to the use of an interconnect agent 170, the controller clients 120 of embodiments of the present invention may be used with any system interconnect protocol currently available.

The multicore processor, as a whole, is configured to execute a target application, which may be broken down into a number of individual tasks, called threads. Each processing resource 150 is allocated a suitable thread by the controller 130, according to a number of parameters, including, but not limited to, the priority of the thread in question, the availability of each processing resource 150 and the suitability of a particular processing resource to the execution of a particular thread. This will again be described in more detail below.

It is however to be understood that the addition of the system management controller 130 and its dedicated memory 190 do not otherwise require a redesign of the layout of the processor 10.

In one embodiment, system management controller 130 comprises control logic to allocate executable transactions within the multicore processor to one of the processor elements in accordance with one of a range of pre-defined allocation parameters. In one exemplary embodiment, at least one of the processor elements is a master processor element. The control logic is in communication with each of the plurality of interconnected processor elements via a plurality of controller clients. Each of the controller clients is associated with a corresponding interconnected processor element and each controller client is configured to control communication between each associated interconnected processing element and the rest of the multicore processor. The control logic may be separate from a master processor element.

Each executable transaction to be allocated can include threads, each of which form part of an application being executed upon the multicore processor. In one embodiment, at least some of the threads are independent threads capable of execution independently of other events, and at least some of the threads are dependent threads, whose execution is dependent upon the existence of a predetermined event.

In one embodiment, the control logic further comprises an executable transaction manager and a dedicated memory manager. The dedicated memory manager controls access by the executable transaction manager to a dedicated memory. The executable transaction manager can further comprise an executable transaction input manager, configured to maintain an indication of available memory within the dedicated memory. The executable transaction input manager can be configured to maintain a list of available memory locations within the dedicated memory. The executable transaction input manager can maintain the indication of available memory as a result of updated instructions from the dedicated memory manager. The control logic can further comprise a time manager configured to provide timer functions to the executable transaction manager.

In another embodiment, the executable transaction manager further comprises an executable transaction synchronisation manager, configured to maintain at least one pending queue list within the dedicated memory, indicative of dependent threads awaiting the occurrence of a predetermined event, and at least one timer queue list within the dedicated memory, indicative of threads awaiting a timing event.

In one embodiment, the executable transaction manager further comprises an executable transaction output manager configured to maintain a plurality of dispatch queue structures within the dedicated memory, indicative of the threads awaiting execution on an associated one of the processor elements, and to maintain a plurality of ready queue structures within the dedicated memory, indicative of threads awaiting allocation to a one of the processor elements for execution there.

In another embodiment, the executable transaction manager further comprises an executable transaction schedule manager, configured to provide and maintain scheduling decisions for prioritising the dispatch of threads from within the ready queues to the dispatch queue for each processor element.

In one embodiment, the control logic further comprises a system interface manager, in communication with the executable transaction manager, and configured to manage access by the controller to the multicore processor. The system interface manager can be arranged to provide interconnect interfacing and configuration and run-time access to the executable transaction manager. In another embodiment, the control logic further comprises a system interrupt manager, for converting system interrupts in a first format employed within the multicore processor, into controller interrupts in a second, different format, which second format is understandable by the executable transaction manager.

Figure 3:
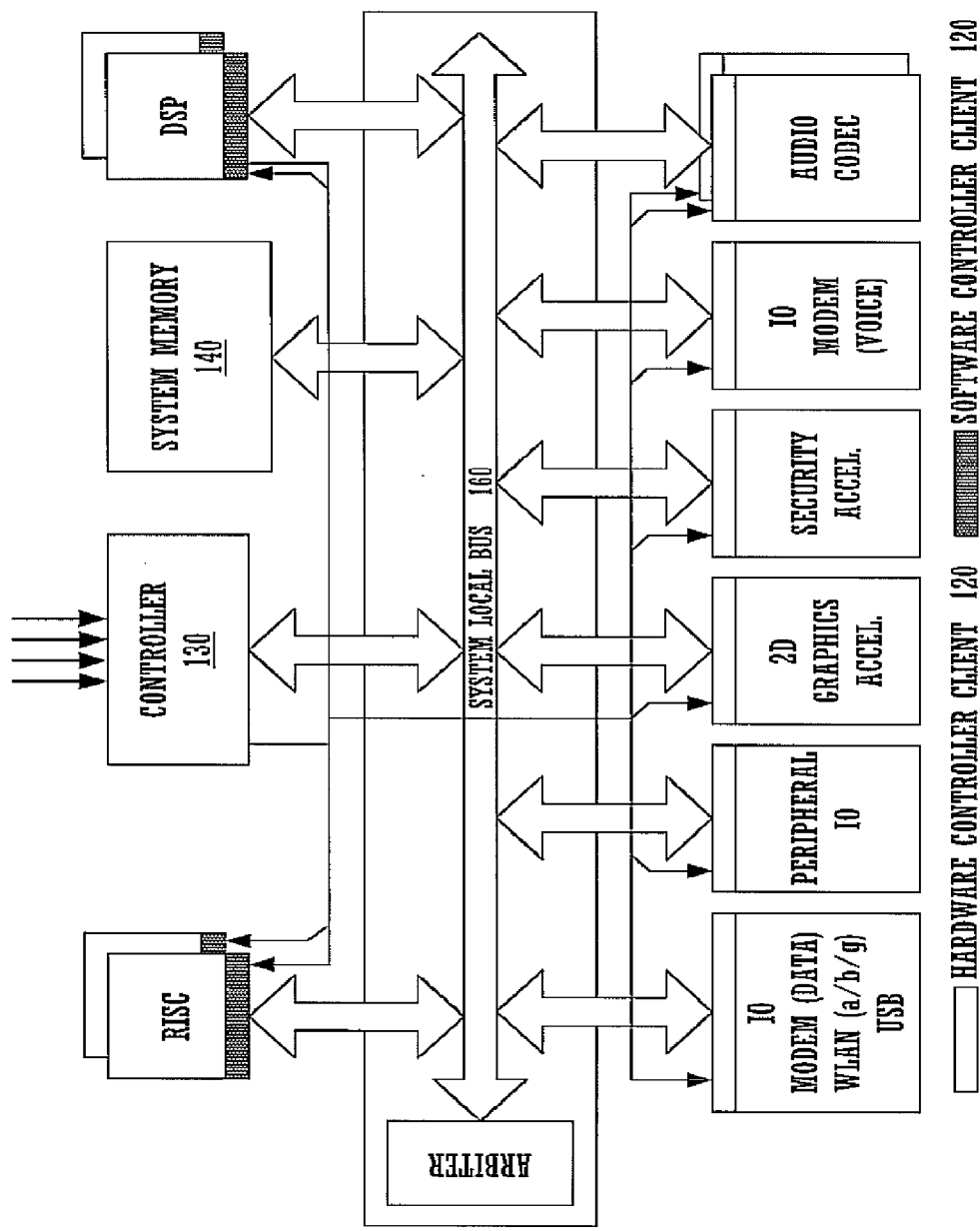
FIG. 3 shows, again in block diagram form, an example of a contemporary System on Chip (SoC) bus-based architecture incorporating the elements of FIG. 2.

One specific arrangement is shown in FIG. 3 which shows a typical System on Chip (SoC) architecture, in block diagram form, and which illustrates the various processing resources that might be placed under the resource management of the controller 130 in a practical application. It will be noted that the processing resources may in particular be of relatively general capability, such as a DSP, or may of relatively limited functionality, such as a peripheral IO.

System Management Controller Interface Groups

Figure 4:
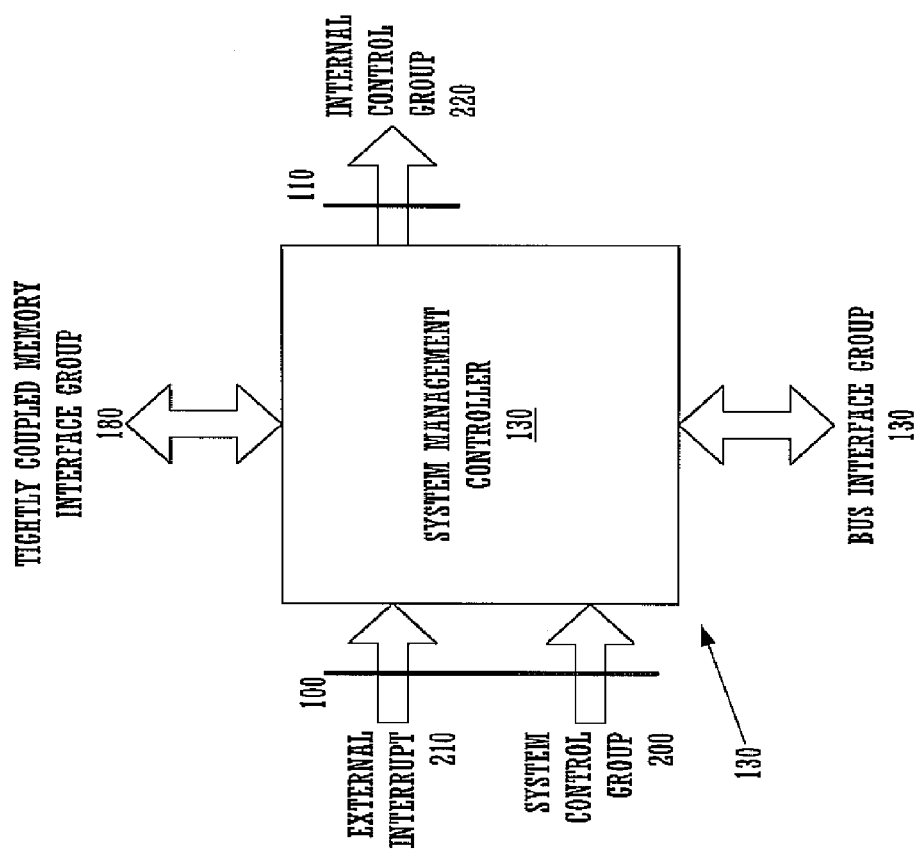
FIG. 4 shows a more detailed view of external connections to the controller of FIGS. 1, 2 and 3.

FIG. 4 shows the controller 130 and its associated interface groups 200-250, located on the periphery of the controller 130.

The system control group 200 comprises the two system input signals required to ensure the correct operation of the system management controller 130. The two system inputs comprise a CLK input, which is connected to the system clock, and a RST input. All output signals from the system management controller 130 are synchronous to the system clock and all input signals to the system management controller 130 are sampled using this clock. The RST input is a synchronous reset signal, for resetting the system management controller 130.

The external interrupt group 210 consists of a group of synchronous external interrupts sourced from outside the system management system. These signals must be synchronised to CLK prior to their attachment to the system management controller 130 periphery. Signals in the external interrupt group 210 may be driven from, for example, input interfaces with the outside world or directly from outside the multicore processor via pins. The number of external interrupt inputs is defined during the multicore processor 10 design phase.

The internal control group 220 consists of a group of two synchronous interrupts for each controller client 120 and its associated processing resource 150. Therefore the number of groups of signals will typically correspond with the number of processing resources 150 within the system and will be defined during the multicore processor 10 design phase. The internal interrupt signals include:

1. An internal thread ready interrupt signal, indicative of a thread ready for execution, and that is being assigned to the particular processing resource 150 associated with that controller client 120; and
2. An internal power down interrupt signal, indicative to the controller client 120 that its associated processing resource 150 should be powered down.

Figure 5:
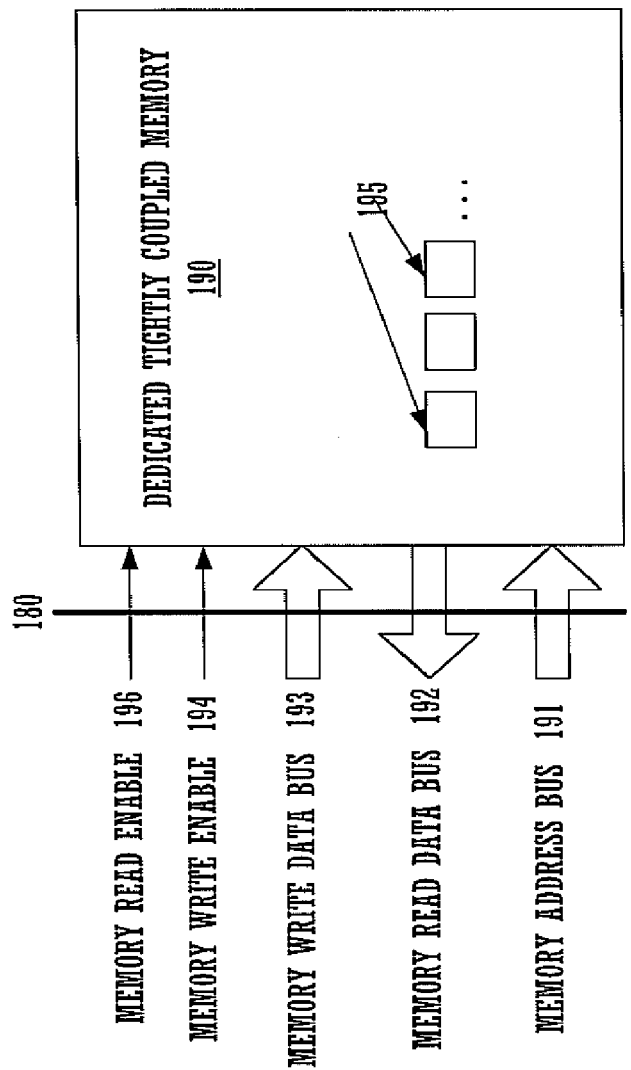
FIG. 5 shows a more detailed view of the memory device of FIGS. 2 and 3.

The tightly coupled memory interface group 180 interfaces the system management controller 130 to its own dedicated tightly coupled memory resource 190. FIG. 5 shows a typical structure of the dedicated tightly coupled memory 190. The width of the address path and the datapath are defined during the multicore processor 10 design phase. The dedicated tightly coupled memory interface includes a memory address bus 191, a memory read data bus 192, a memory write data bus 193 and write 194 and read 196 enable signals.

The attached memory is assumed to be a synchronous SRAM device. The dedicated tightly coupled memory 190 contains an integer number of controller memory elements 195, as defined during the multicore processor 10 design phase, according to the needs of the target application. In the currently preferred embodiment, each controller memory element 195 consumes 256 bits of memory space. Again in the currently preferred embodiment, the controller supports a maximum of 65536 controller memory elements (i.e. a 16 Mb memory). Although queue descriptors, as described later, do consume controller memory elements 195, in a typical system the number of controller memory elements 195 required would be dominated by thread support requirements. For example, a system capable of supporting 400 threads simultaneously within the system management controller 130 would require approximately 128 kb of attached memory.

The interconnect interface group 230 of FIG. 4 conforms to the chosen interconnect protocol used in the multicore processor 10, and the interconnect agent 170, which is defined during the multicore processor design phase.

Controller Subblock Description and Functions

Figure 6:
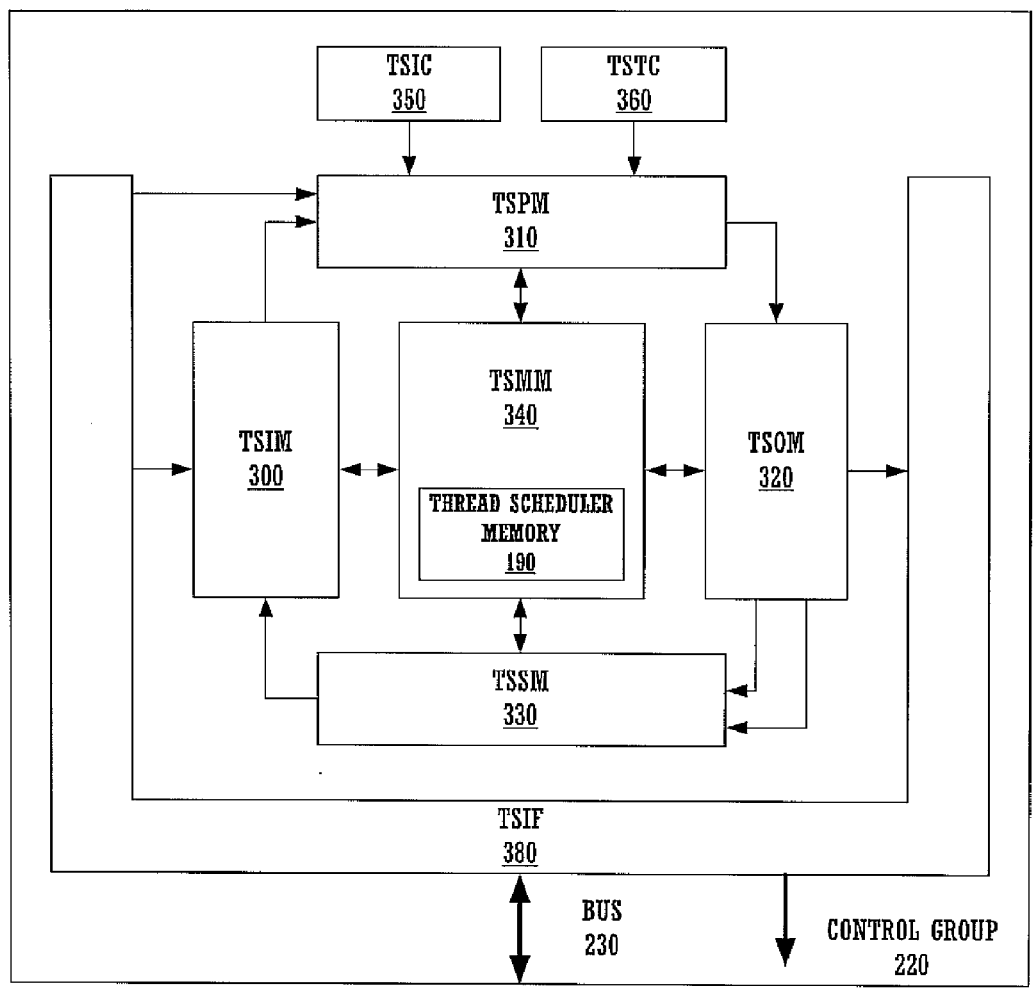
FIG. 6 shows a more detailed view of the internal composition of the controller of FIGS. 2, 3 and 4.

FIG. 6 shows the main logical components of the system management controller 130. The functionality of the controller 130 is split amongst four primary internal parallel processing subblocks, performing the following functions:

1. A Thread Input Manager (TSIM) 300, configured to maintain a list of free controller memory elements 195 within the dedicated tightly coupled memory 190, and to oversee controller memory element 195 recovery.
2. A Thread Synchronisation Manager (TSPM) 310, configured to maintain Pending lists and a timer queue within the dedicated tightly coupled memory 190 and to perform synchronisation between threads, and to perform promotion of threads to Ready queue structures within the dedicated tightly coupled memory 190, as required. The Thread Synchronisation manager 310 maintains the integrity of the pending and timer queue structures via insertion and extraction of pending thread descriptors within the dedicated tightly coupled memory 190.
3. A Thread Output Manager (TSOM) 320, configured to maintain Ready queue structures within the dedicated tightly coupled memory 190, and Dispatch queues for each processing resource 150 within the dedicated tightly coupled memory 190. The Thread Output Manager (TSOM) 320 is further configured to perform processing resource 150 power management, and to generate the interrupts 220 sent to the controller clients 120. Maintenance of the integrity of the ready queue structures is performed by insertion and extraction of thread descriptors held in controller memory elements 195, within the dedicated tightly coupled memory 190.
4. A Thread Schedule Manager (TSSM) 330, configured to provide scheduling decisions for each processing resource 150 within the ready queue structures located within the dedicated tightly coupled memory 190.

Additionally a number of secondary processing subblocks provide support functions:

5. A Thread Memory Manager (TSMM) 340, configured to provide aggregate access to the attached dedicated tightly coupled memory 190, including mutual exclusivity and locking.

6. An Interrupt Manager (TSIC) 350, configured to convert incoming external system interrupts into internal synchronisation primitives.

7. A Time Manager (TSTC) 360, configured to provide timer functions for synchronisation purposes and watchdog timer functionality to each processing resource 150.

8. A System Interface (TSIF) 380, configured to provide interconnect interfacing and configuration and run-time access to the multicore processing resources 150.

There now follows a detailed description of the interaction of the above primary and secondary processing sub-blocks within the system management controller 130.

Each sub-block presents a set of functions to other sub-blocks, enabling each to instruct its peers to execute manipulations on their respective maintained structures within the dedicated tightly coupled memory 190. Functions are called by a particular subblock, on receipt of a similar command received at a controller software Application Programming Interface (API).

Thread Input Manager Functions:

The thread input manager 300 provides three public functions to other sub-blocks within the system management controller 130.

The FreeListStatus function returns the head pointer and number of elements within the controller memory element 195 free list. The free list is a list of the controller memory elements 195 that are currently unused. This function can only be called by the system interface 380, on receipt of a similar command at the controller 130 software API The PushFreeIndex function is used to push a liberated controller memory element 195 index back onto the free list. This function can only be called by either the system interface 380, on receipt of a similar command at the controller 130 software API, or the thread Schedule Manager 330.

The PopFreeIndex function is used to pop a free controller memory element 195 index from the free list. It is typically called from within the API call service routine within the system interface 380.

Thread Synchronisation Manager Functions:

The Thread Synchronisation Manager 310 provides seven public functions to the other sub-blocks within the system management controller 130.

The following five functions can only be called by the system interface 380, in response to similar commands received by the controller 130 software API.

The PushPendingDescriptor function is used during the boot process to add a pending queue descriptor to the list of pending queue descriptors.

The PushThread function is used during runtime to add a dependant thread to a given pending queue.

The TimerStatus function returns the head pointer and number of elements within the timer queue.

The SetPendingStatus function sets the status of the pending queue descriptor list.

The GetPendingStatus function returns the head pointer and number of elements within the pending descriptor queue.

The SyncEvent function is used to issue a synchronisation primitive to a given pending queue. This function is only called by the thread interrupt manager 350.

The TimeEvent function is used to issue a timer based synchronisation primitive to the timer queue. This function is only called by the time manager 360.

Thread Output Manager Functions:

The Thread Output Manager 320 provides five public functions to the other sub-blocks within the system management controller 130.

The Push function places a thread descriptor within the ready queue structure. The method may be called with high priority to expedite processing speed (for example, to handle interrupts). Where threads are independent (immediately ready) the call will be made from the system interface 380, where the thread descriptor originally had dependencies the call is made from the thread synchronisation manager 310.

The following three functions can only be called by the system interface 380, in response to the receipt of a similar command at the controller 130 software API The GetDispatchQueueStatus function returns the head pointer and number of elements within the dispatch queue list.

The SetDispatchQueueStatus function sets the head pointer and number of elements within the dispatch queue list.

The DispatchQueuePop function pops a thread descriptor from a the head of a dispatch queue.

The DispatchWorkQueuePush function pushes a dispatch queue onto the thread output manager 320 work queue. This function can only be called by the thread schedule manager 330, which uses this function to inform the output manager 320 of changes required within the dispatch queue as a result of schedule updates.

Thread Schedule Manager Functions:

The Thread Schedule Manager 330 provides two public functions to the Thread Output Manager 320, located within the system management controller 130.

The PushPushWorkEvent function is called by the thread output manager 320, immediately after it adds a thread descriptor to a ready queue structure.

The PushPopWorkEvent function is called by the thread output manager 320, immediately after it removes a thread descriptor from a ready queue structure.

Controller Client

As described earlier, the term processing resource 150 is applied to any resource that may execute an instruction, regardless of how rudimentary the instruction may be. Therefore resources that have a fixed function, such as an input/output module, are also included. Depending on the type of processing resource 150, the connection between the system interconnect 160 and the processing resource 150, via the system management core client 120 may be either uni-directional or bi-directional.

Figure 7:
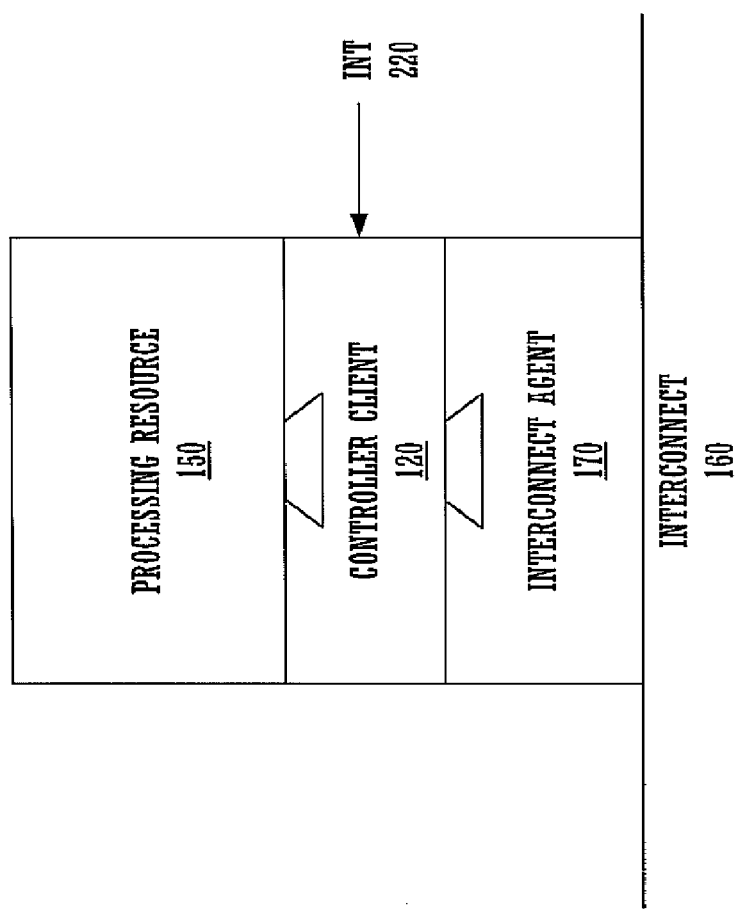
FIG. 7 shows a schematic block diagram of a controller client as shown in FIGS. 2 and 3.

FIG. 7 shows a schematic block diagram of a controller client 120 for use with the system management controller 130.

On appropriate processing resources 150, for example general purpose processors or Digital Signal Processors, the controller client 120 will typically be implemented in software. However, where the processing resource 150 is of limited function, the controller client 120 may require a hardware component.

When a hardware component is used, the controller client 120 still interfaces to the processing resource 150 using the same interface. That is to say, the controller client presents an identical interface to the interconnect agent 170 as that of the processing resource 150 to the controller client. In some cases, it is appropriate to treat the data path into the processing resource as distinct from the data path out of the processing resource, for example in the case of an Input/Output device.

In addition to the main interface, the controller client 120 also provides out of band interfaces for use as outputs for run-time and debug events. Where a software controller client 120 is used, these are provided using standard interrupts, calling appropriate service routines.

Controller Client Mode of Operation:

Each controller client 120 is fully interrupt driven. Upon receipt of an internal interrupt from the controller 130, the controller client 120 pops the thread descriptor from the head of the dispatch queue associated with that particular processing resource 150, which is held in the dedicated tightly coupled memory 190. The unique reference within the thread descriptor is then used to read further thread control information, the Thread Control Block (TCB), from the main memory resource 140. The information contained within the TCB may be any of:

1. Controller client 120 configuration content. This information may be used to configure controller client 120 system resource usage policing, data presentation mode, and the like.

2. Processing Resource 150 Configuration content. This is information required to prepare the processing resource 150 for execution of a particular thread. This may include recovery from a previous partial execution of this thread or configuration of a specialist hardware accelerator, such as an audio CODEC.

3. Instruction content. In the case of a fixed function hardware accelerator, the "instruction" will be implicit in the targeted hardware processing resource 150, for example an output instruction when the processing resource 150 is an output module, and any required specialisation or configuration will be accommodated within the configuration information. In the context of a software controller client 120, this will typically be a pointer to the function code associated with the thread.

4. Data content. This content may define the start address or multiple addresses in the system memory 140 and range of data over which the thread may operate.

5. Controller client 120 post-processing content. This content determines the actions of the controller client 120 after the completion of the thread execution.

There are three distinct phases of operation of the controller client 120:

1. Configuration phase, where the processing resource 150 and the controller client 120 are prepared for execution of a particular thread. In the simplest case the configuration phase will be null.

2. Execution phase, where the thread is being executed and the controller client 120 may be supplying data and/or monitoring resource utilisation.

3. Completion phase. Completion of processing may result in no action, the creation of another thread, the issuance of a synchronisation primitive or a combination of thread creation and synchronisation. Furthermore, the controller client 120 may also be required to set or update scheduler metrics and terminate threads. In the event that, during execution of the thread, further memory is required to store results, the controller client 120 must also execute this server method.

As mentioned previously, the controller client 120 may be implemented in software. In this case some of the functionality of the controller client 120, for example shared resource usage policing, will typically make use of existing hardware components which may already be present in the processing resource 150 hardware (for example, a memory management unit (MMU)).

Consequently, the software controller client 120 architecture and implementation is processing resource 150 specific.

Hardware controller clients 120 may also have specialist requirements according to the idiosyncrasies of the associated processing resource 150. The following section describes a generic architecture which will be suitable in the majority of cases.

General Example of a Hardware Controller Client

Figure 8:
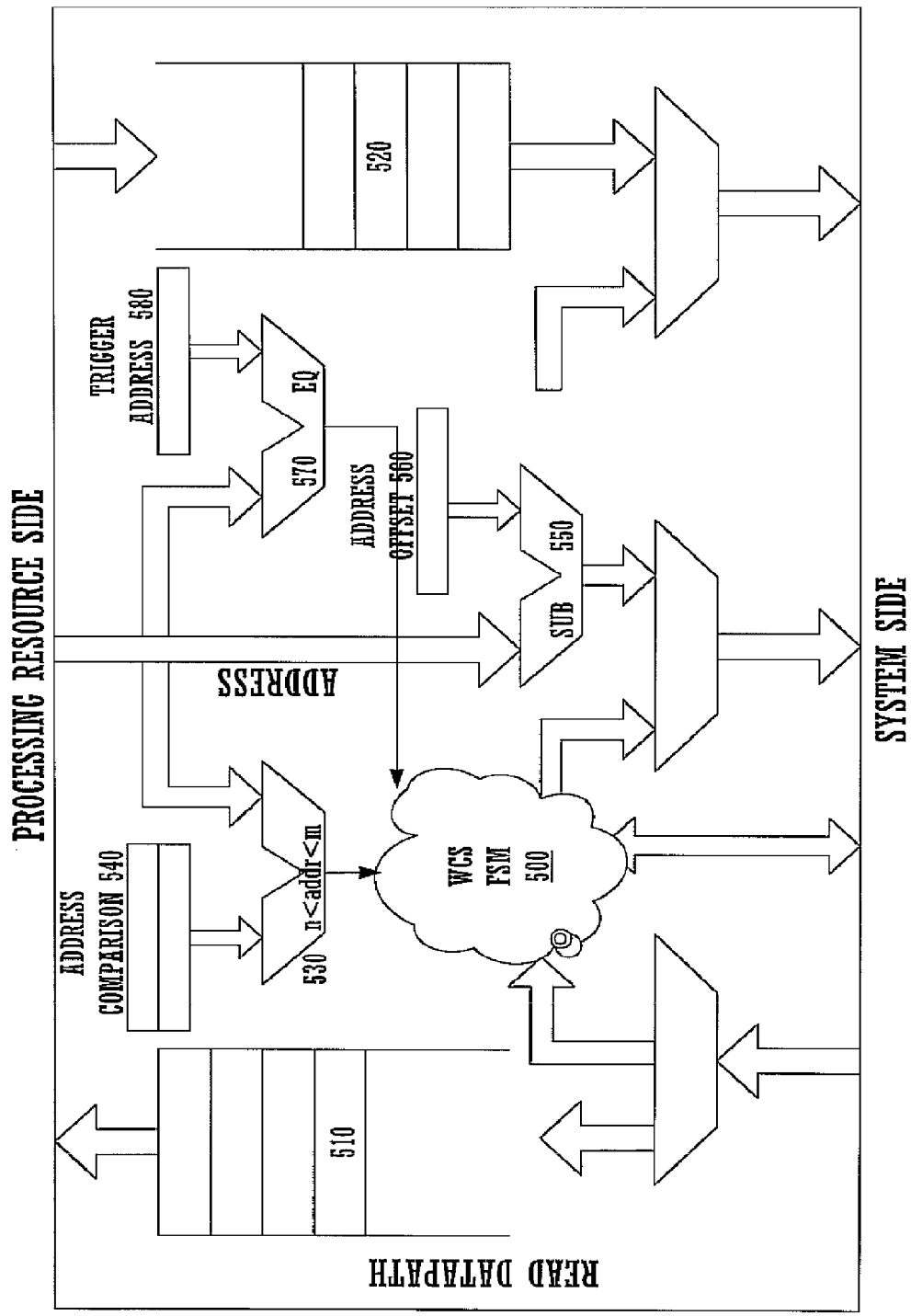
FIG. 8 shows a more detailed schematic block diagram of a hardware controller client.

The basic structure of the hardware controller client 120 is shown in FIG. 8. At the functional heart of the design is the controller client Finite State Machine (FSM) 500. This Finite State Machine (FSM) 500 may be active during all three phases. The controller client FSM 500 is activated by an interrupt 220 from the controller 130.

Firstly the controller client FSM 500 masters the system interconnect 160 to read the TCB from the shared memory resource 140, which contains a reference to its own instructions. During the configuration phase the controller client 120 may master the processing resource interface, interpreting configuration commands and translating them into write cycles issued to the processing resource 150. Furthermore, the controller client 120 configures its own resource policing. The manner in which the transition from the configuration state to the executing state is processing resource 150 specific, but may be marked by an explicit execute primitive or merely an entry into a data transferal state.

From a controller client 120 perspective the simplest architecture has an identical interface protocol on both the processing resource 150 and the system side. In this case, during the execution phase, processing resource 150 read and write cycles are simply mapped across to the system interface with checking where appropriate.

The simplest controller client 120 implementation would require a FIFO style interface in both the system to processing resource 510 and processing resource to system 520 paths. During the execution phase of a controller client 120 of this nature, data can be presented to a processing resource 150 by message or streaming modes. Message mode, where the entire dataset is accumulated locally within the controller client 120 prior to processing, engenders a more coarse grain blocky interconnect behaviour which may facilitate more complex interconnect arbiters. Streaming mode, where data is streamed directly from the system memory into the processing resource 150, presents a more silicon efficient solution requiring more careful consideration of hand-shaking and exhibiting fine grained interconnect transactions and tight coupling to interconnect performance.

The transition from the execution to the completion phase may be inferred, by measuring the presentation of data to the processing resource 150, or explicitly signalled by the processing resource 150 itself. During the completion phase, the controller client 120 once again executes from the set of instructions provided by the original thread control block.

Note that, in some cases, it is appropriate to treat the datapath into the processing resource 150 (for example an input/output device) and the path out of the processing resource 150 as distinct. In contrast it will be natural in some cases (for example, algorithmic accelerators such as DSPs) to couple the consumer and the producer of data within the same controller client 120 framework.

In order to provide a level of decoupling between the processing resource 150 and the other system resources, a number of additional facilities may also be provided by the controller client 120:

a) Addresses generated by the processing resource 150 may be checked against expected behaviour as defined by a base address and offset definition, by using a comparator 530 and a comparison address register 540.

b) Addresses generated by the processing resource 150 may be offset, using a subtractor 550 and offset address register 560, enabling the processing resource 150 to have a normalised view of the address map for any given thread, typically normalised around address 0x0.

Objects

Instances of datatypes used within the system management controller 130 are divided into public (visible from and manipulated by the system at large) and private visibility (visible only within the system management controller 130 and manipulated only by the system management controller 130 sub-blocks). To ensure portability of the design across multiple end applications, all thread, queue and aggregated queue descriptors are stored within the dedicated tightly coupled memory 190 using a common base class, the controller memory element 195.

Controller Memory Elements

Each controller memory elements 195 may represent any of seven descriptor types:

1. Free List Element. This element is free for usage by any of the other descriptor types. No user initialisation or runtime manipulation is required.

2. Thread descriptor (TD). This is a data structure representative of an application/OS thread. This descriptor may exist in either a pending queue, a Ready queue or a dispatch queue within the dedicated tightly coupled memory 190. No user initialisation is required, but runtime manipulation is required.

3. Scheduler Root Descriptor (SRD). This is the top descriptor of a scheduler hierarchy. User initialisation is required, but no runtime manipulation is required. The root descriptor has no parent, but children can be any of: an SSTD, a DSTD or a TD.

4. Static Scheduler Tier Descriptor (SSTD). This is a static scheduler tier descriptor, whose parent may be either an SRD or another SSTD. The SSTD's children can be any of: another SSTD, a DSTD or a TD.

5. Dynamic Scheduler Tier Descriptor (DSTD). This is a dynamic scheduler tier descriptor. User initialisation is not required, but runtime manipulation is required. The parent of a DSTD may be either an SRD or an SSTD, but a DSTD may only have TD children.

6. Dispatch Queue Descriptor. This type of descriptor describes a list of thread descriptors, which are waiting for pop operations from the associated processing resource 150. User initialisation is required including depth watermarks, but no runtime manipulation is required.

7. Pending Queue Descriptor. This type of descriptor describes a list of thread descriptors, which are awaiting a synchronisation event. User initialisation is required, but no runtime manipulation is required.

These descriptors are described in greater detail in the following sections.

The various forms of the Controller Memory Elements 195, and their respective are shown in FIGS. 9a to 9l.

Thread Representation

Where a descriptor requires initialisation or run-time manipulation, operations are done through the controller 130 API. The centralised task allocation and management system is designed to ensure that real-time interaction is suitable/simplistic enough for a hardware implementation.

Figure 10:
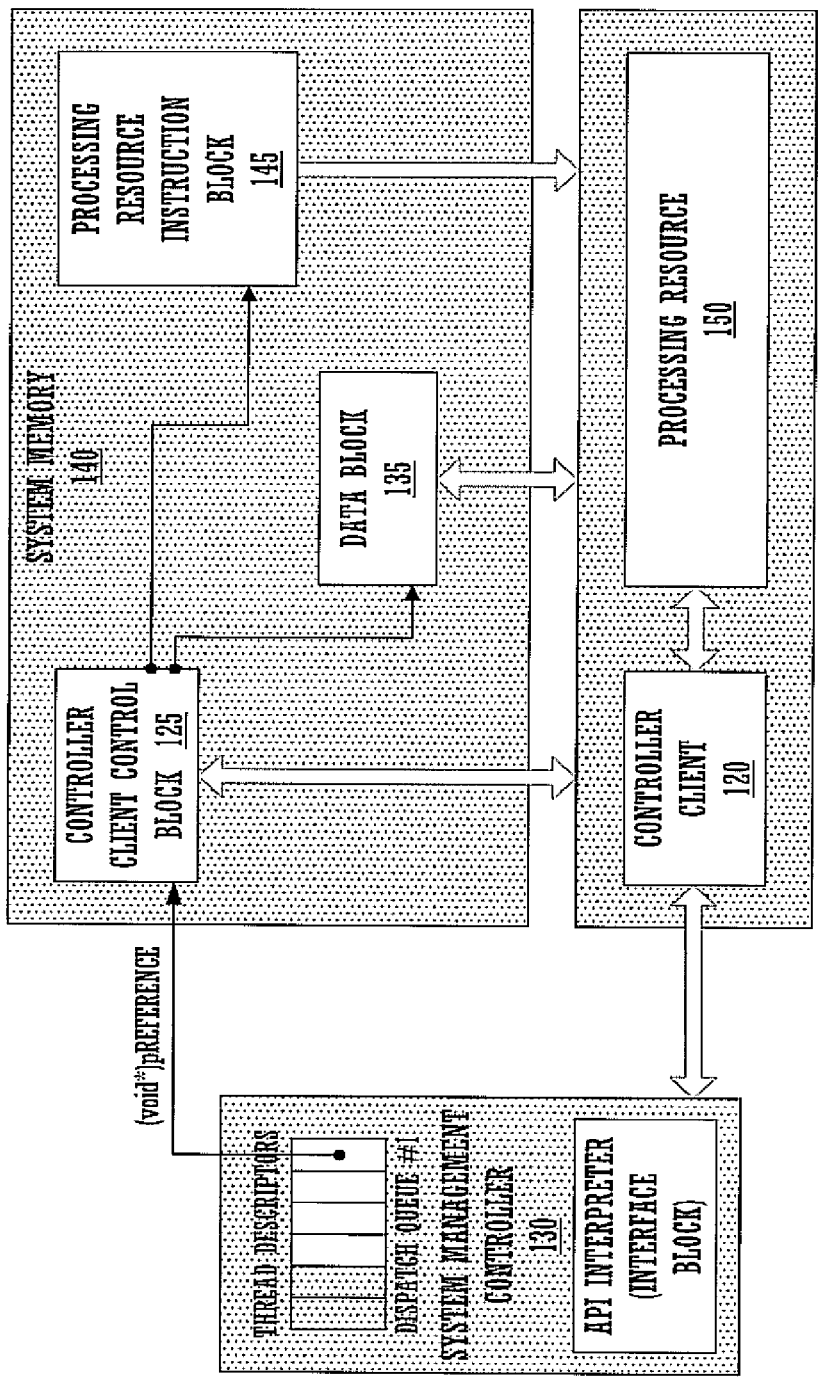
FIG. 10 shows a typical relationship between a thread descriptor, the system management controller, a processing resource and the shared system memory.

FIG. 10 shows a typical relationship between a thread descriptor, the system management controller 130, a processing resource 150 and the shared system memory 140. Each thread primitive contains a unique reference, pReference. This reference is not interpreted or modified by the system management controller 130. pReference provides a pointer to a data structure in system memory 140 defining the task to be executed. Typically this would be a controller client control block 125, and would contain at least the following elements: a Function pointer (shown in FIG. 10 as a processing resource instruction block 145), a Stack Pointer and an Argument Pointer (shown together in FIG. 10 as a data block 135). Additional fields may be defined which provide in-band configuration or security over shared system resources.

However, according to the application and/or target processing resource 150 the complexity of the controller client control block 125 may vary. In particular, note that further levels of indirection may be included which, given appropriate "control" instruction code and corresponding "datapath" code, may enable disparate processing resources 150 to execute the same functions on the same data under certain circumstances.

Figure 11:
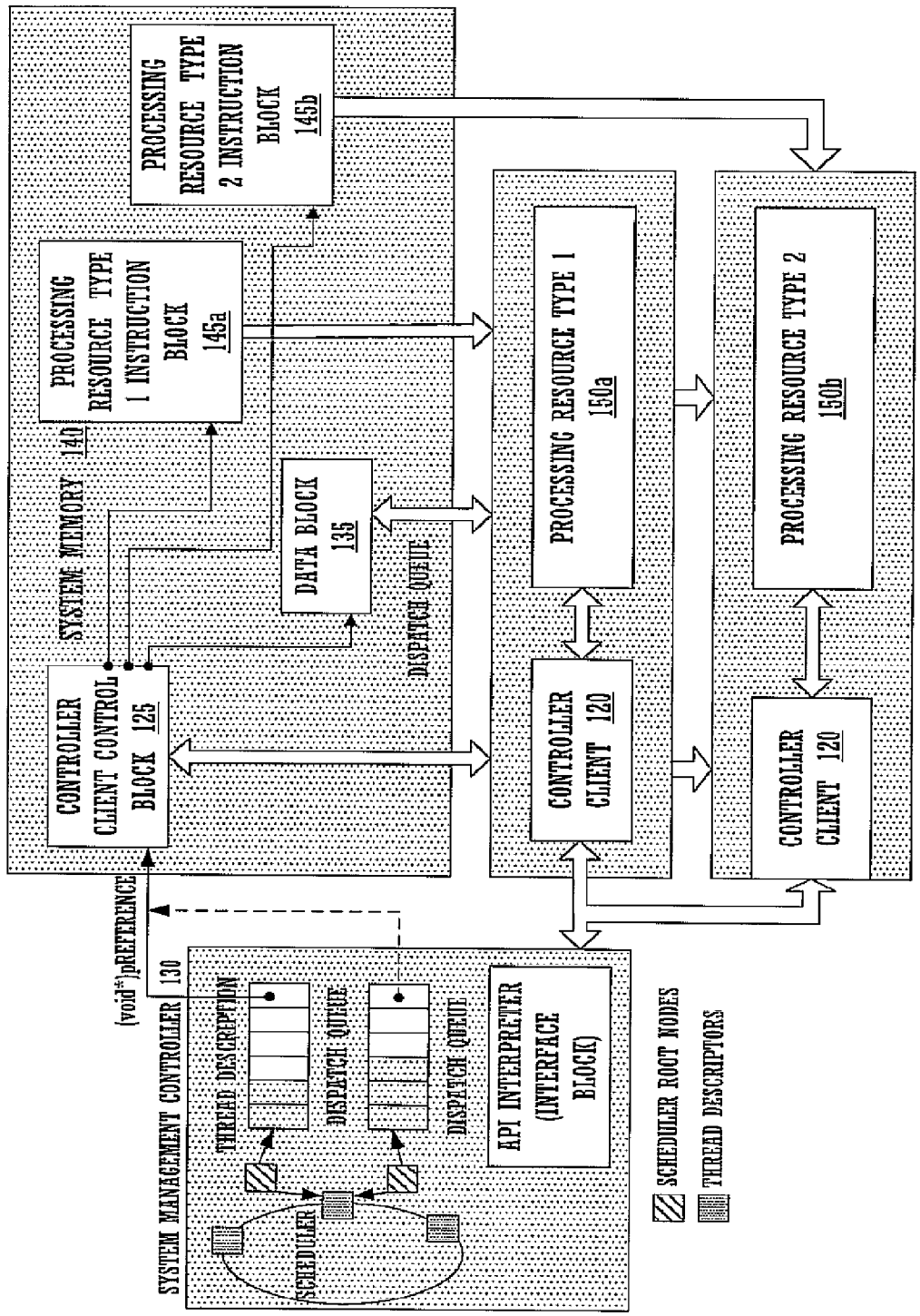
FIG. 11 illustrates the principle of indirection in the arrangement of FIG. 10, where two dissimilar processing resources are present.

FIG. 11 shows an example where a scheduling hierarchy load balances tasks across two dissimilar processing resources (Type I and Type II in FIG. 11) 150a and 150b. The pReference field (within the thread descriptors which are queued to this hierarchy) references a controller client control block 125 as before, except here there are pointers for each type of processing resource corresponding to the particular instruction stream required by the dissimilar instruction sets of each. The controller client 120 selects the appropriate instruction stream (instruction block 145a or 145b) according to flags within the Controller client control block 125.

This feature may be useful, for example, in conjunction with the power-down feature of certain processing resources. In the case where the optimal processor for a given task is powered down, it may be desirable for a sub-optimal processor to execute the task rather than incur a costly reboot cycle.

Furthermore, under exceptional loads it may enable a lightly loaded general purpose processor, for example, to relieve the burden on a heavily loaded DSP.

When a processing resource 150 is ready to deal with a thread, it is popped from the appropriate dispatch queue uniquely associated with that processing resource 150. The pop operation returns an object containing pReference, the scheduler metrics that resulted in the scheduling event, and a set of flags including an indication of whether the thread became Ready due to a timeout or a synchronisation primitive. The controller memory element 195 used for the thread descriptor is automatically returned to the free list for use by future thread descriptors.

Public Objects

This section describes the objects visible to the system through the controller 130 API. Typically these objects are manipulated by the centralised task allocation and management system, comprising the controller 130 and the clients 120 and their associated processing resources 150, at runtime.

The runtime controller 130 API enables the application to introduce new threads, introduce new dynamic scheduler elements, issue synchronisation primitives, pop scheduled threads, push pre-empted threads or remove threads.

Figure 12:
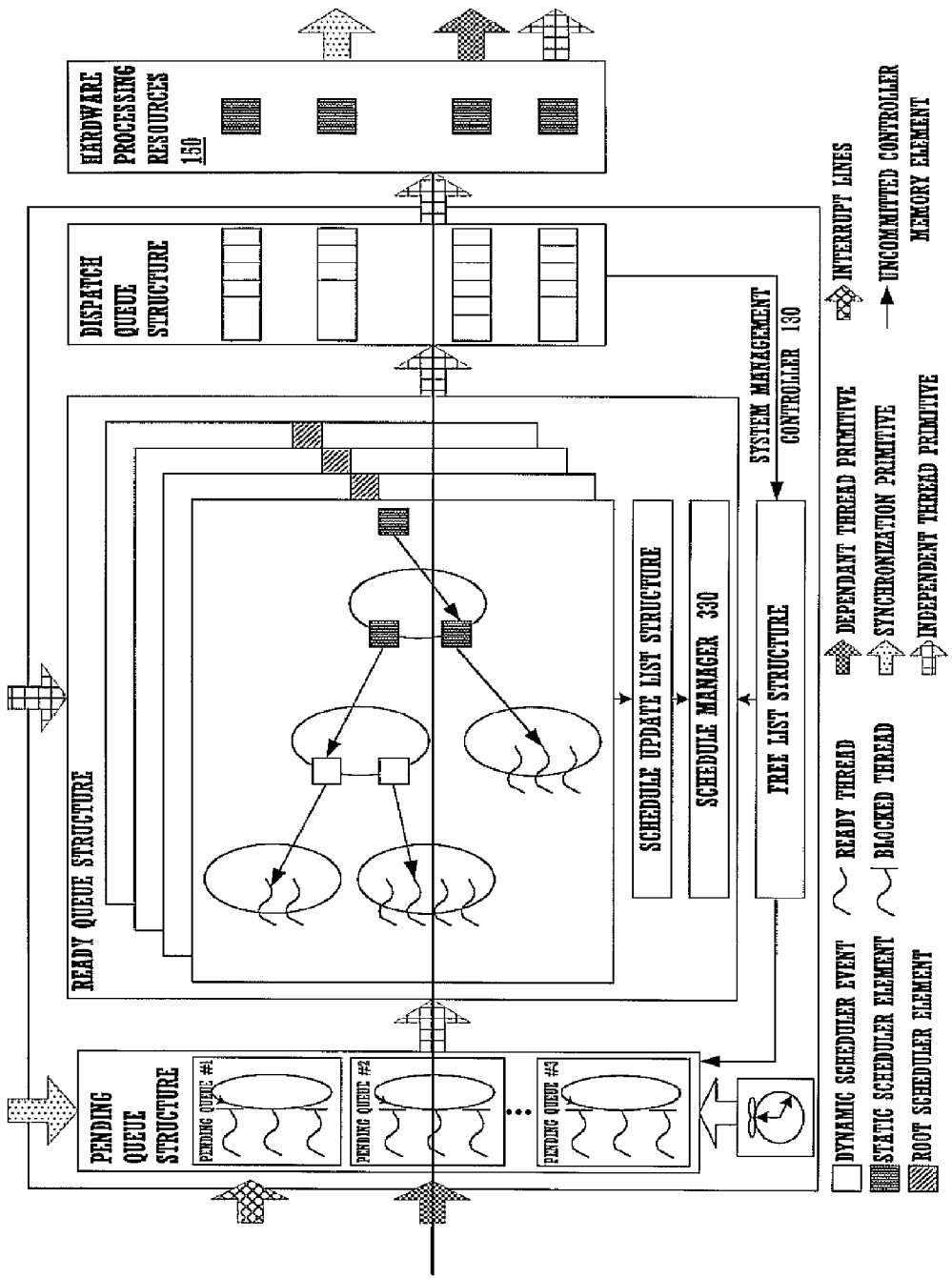
FIG. 12 shows a typical overall view of thread management within the controller of FIG. 4.

FIG. 12 shows a typical overall view of thread management within the system management controller 130.

Thread Primitives

The format of a thread primitive is shown in FIGS. 9c and 9d. According to its dependencies, a thread descriptor may be placed in the pending queue structure or directly into the Ready queue structure. If a thread is to be placed within the pending queue structure the application must define the dependencies of the thread. Dependence upon an external event manifests itself as a dependency reference. The controller 130 does not interpret this dependency reference; it is maintained for comparison to the incoming synchronisation primitives to determine when to transition the thread descriptor into the Ready queue structure.

For dependant threads a timeout may be specified, in conjunction with a null dependency reference this facility may be used as a thread based hardware-timing facility. Regardless of the dependency reference, timeouts cause the thread to be scheduled at a particular time.

Threads are tagged according to the synchronisation event (timer or primitive) that causes them to be promoted to the Ready queue structure.

Synchronisation Primitives

Synchronisation primitives interface with the pending queues and may cause the transition of one or more thread descriptors from the pending queue structure to the Ready queue structure.

Each synchronisation primitive contains a unique reference which is compared with the dependency reference stored within each thread descriptor in the identified pending queue. The comparison continues in the order of priority identified by the thread primitives.

According to its type, a synchronisation may wake either the highest priority matching thread descriptor or all matching thread descriptors within a pending queue. Furthermore, a special broadcast primitive wakes all matching thread descriptors within all pending queues.

Interrupt Processing

An Interrupt Service Thread (IST) methodology provides a valuable means of minimising the load imposed on processing resources 150 by asynchronous events. Furthermore, the accelerated real-time response in systems based on the present invention enables more widespread use of ISTs with minor system modifications.

The controller 130 automatically creates synchronisation primitives from external interrupt inputs 210 on the controller periphery. Preconfigured interrupt service thread descriptors within the pending queues will be promoted to a Ready queue structure upon reception of these interrupt synchronisation primitives.

The application will normally configure the thread descriptor associated with the external interrupt 210 at system initialisation and again within each execution of the associated interrupt service thread.

This facility effectively removes the need for any other dedicated interrupt servicing processing resource 150 within the system. Furthermore it processes these external interrupts 210 through the same priority structure and according to the same policies used for all processor tasks, precluding the need for context switches within processing resources already executing higher priority tasks. An arbitrary number of nested interrupts are supported by the ability to push the currently executing thread back onto the head of the dispatch queue using the normal pre-emption routines.

Timer based interrupts (watchdogs and periodic events) are handled in a similar manner. Time based tasks (periodic or one-shot) must be inserted onto the timer queue and are handled in a similar manner to threads with a timeout dependency. By design, this methodology precludes time based exceptions with no useful processing requirement.

Interrupt priority may be set such that interrupt routines are allowed to pre-empt currently executing tasks for fast response times.

Private Objects

Private objects are typically configured at boot-time, i.e. during system initialisation after a power down cycle. Processing resources 150 rarely interact directly with internal objects during runtime.

The internal objects are primarily queuing structures. The system management controller 130 administers four primary types of queue: Pending Queues, a Timer Queue, Ready Queues and Dispatch Queues.

Additional secondary queues exist within the system management controller 130 to facilitate internal operations. Movement of thread descriptors between queues takes place with pointer manipulations only. Thread descriptors are never copied.

Pending Queue Structure

Threads may be promoted from a pending queue structure to the ready queue structure through either a synchronisation event or a timer event. A thread may be sensitive to both, or just one of these classes of events. In the case where a thread is sensitive to both, the thread is present in both the pending and the timer queues.

Pending queues hold dependent threads awaiting a synchronisation event. Threads are removed from these structures through either a synchronisation primitive, from a processing resource 150, or by a timer event internally generated by the time manager 360. A configurable number of pending queues are available to the application programmer to support multiple contention scopes and interrupt service threads; elements within each pending queue must be processed according to their priority. There are two alternatives to processing according to priority, sort on insertion and sort on extraction. Sort on insertion defines a process by which the pending list is stored in strict priority order and new threads are inserted into a position within the list according to their priority. Sort on extraction makes an arbitrary choice of where to insert a new thread and performs priority based sorting of eligible thread descriptors after synchronisation. The preferred embodiment of the present invention employs the sort on insertion technique.

Figure 13:
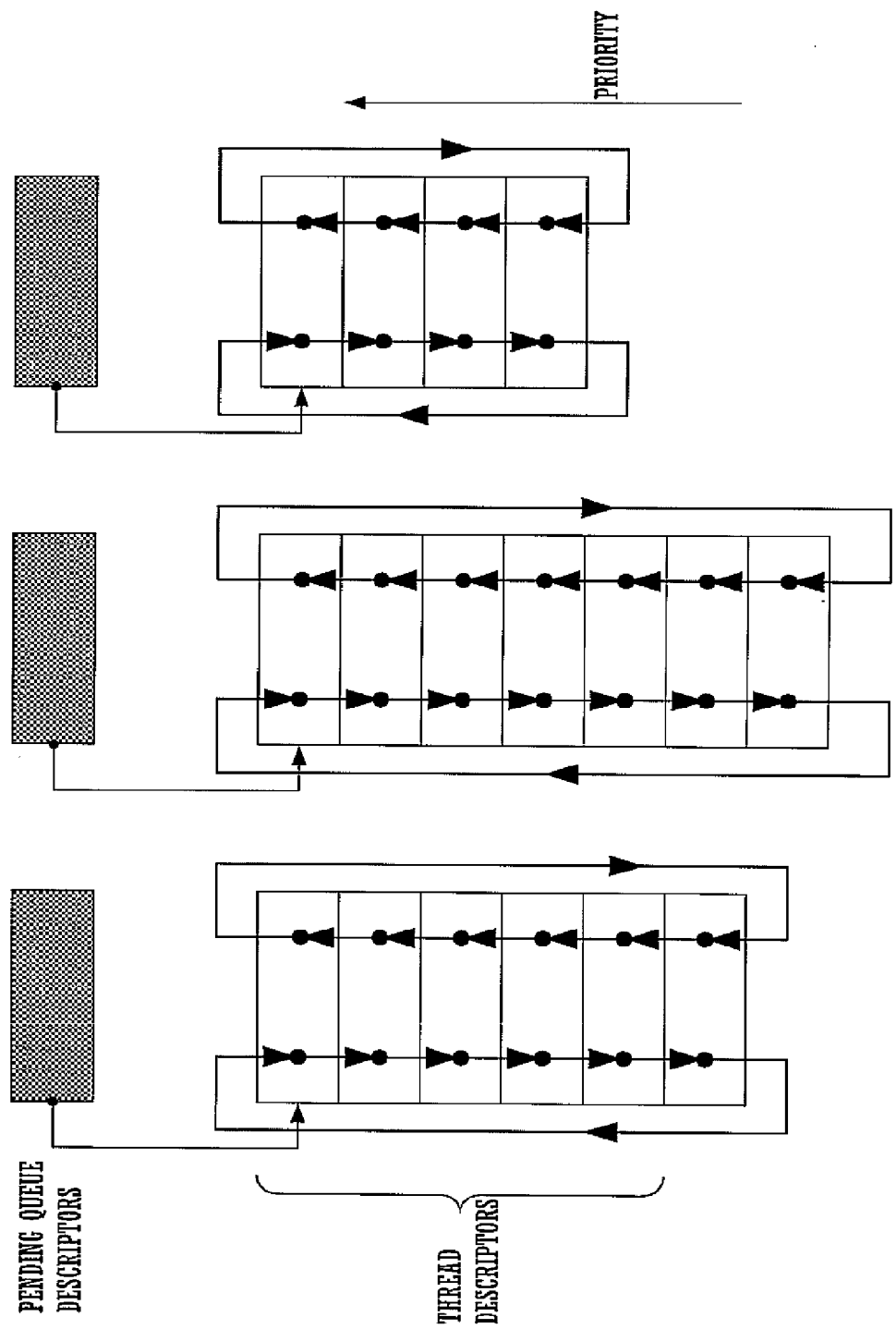
FIG. 13 shows a typical pending queue structure.
Figure 14:
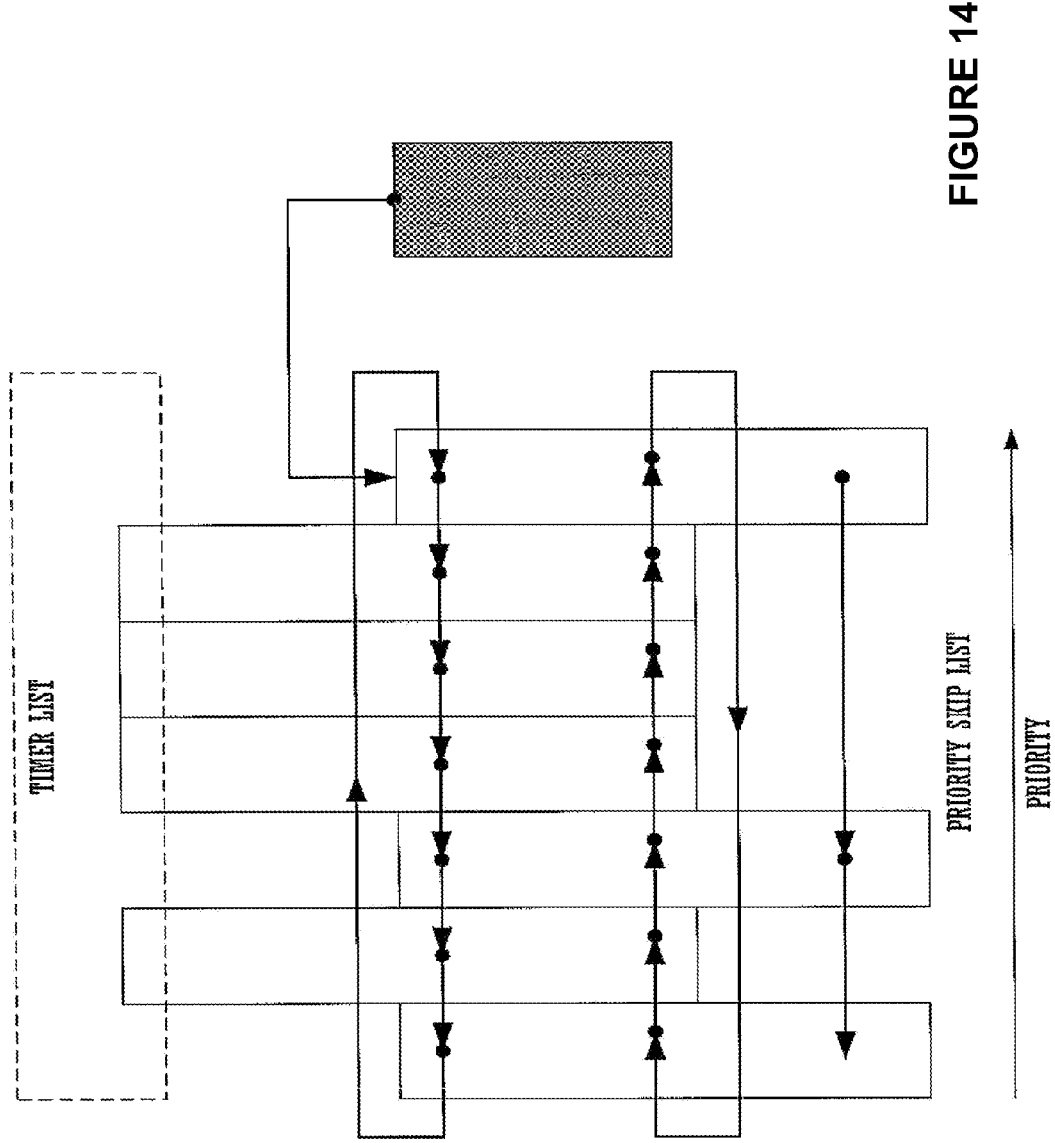
FIG. 14 shows a typical pending queue skip list.

FIG. 13 shows a typical structure of the pending queues. Entries are stored in strict priority order. The speed with which the insertion of a new thread may be achieved is accelerated by the use of skip lists, and FIG. 14 shows a typical pending queue skip list.

As previously stated, threads may be blocked awaiting synchronisation or timer events. Some threads will be exclusively awaiting a synchronisation event and similarly, some threads will be exclusively awaiting a timer event. In each case, the thread will only be present in a single queue. Each thread contains two sets of pointers, nominally associated with both the pending and timer queues. In these cases the provisioned timer queue and pending queue pointers respectively are spare. Skip lists may take advantage of these spare pointers—for example, if the thread does not appear in the timer queue, these pointers may be reused to indicate a possible jump ahead in the pending queue. This enables an otherwise sequential search to jump blocks of thread descriptors whilst iteratively approaching a correct insertion point for a new dependant thread.

Figure 9I:
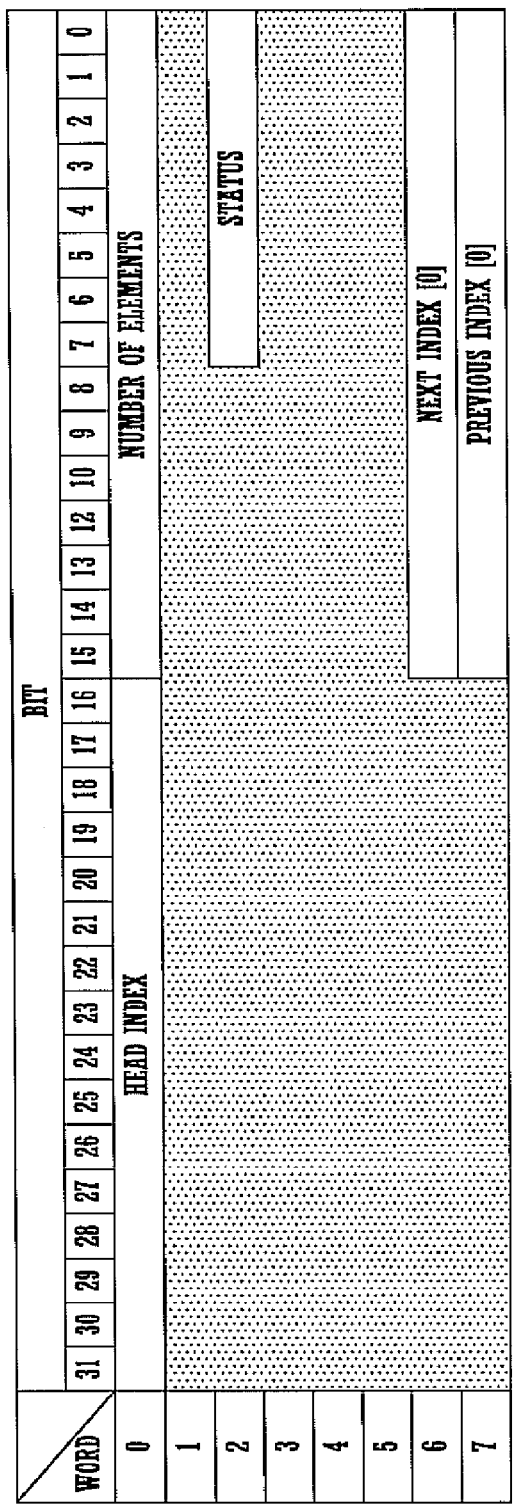
Figure 9K:
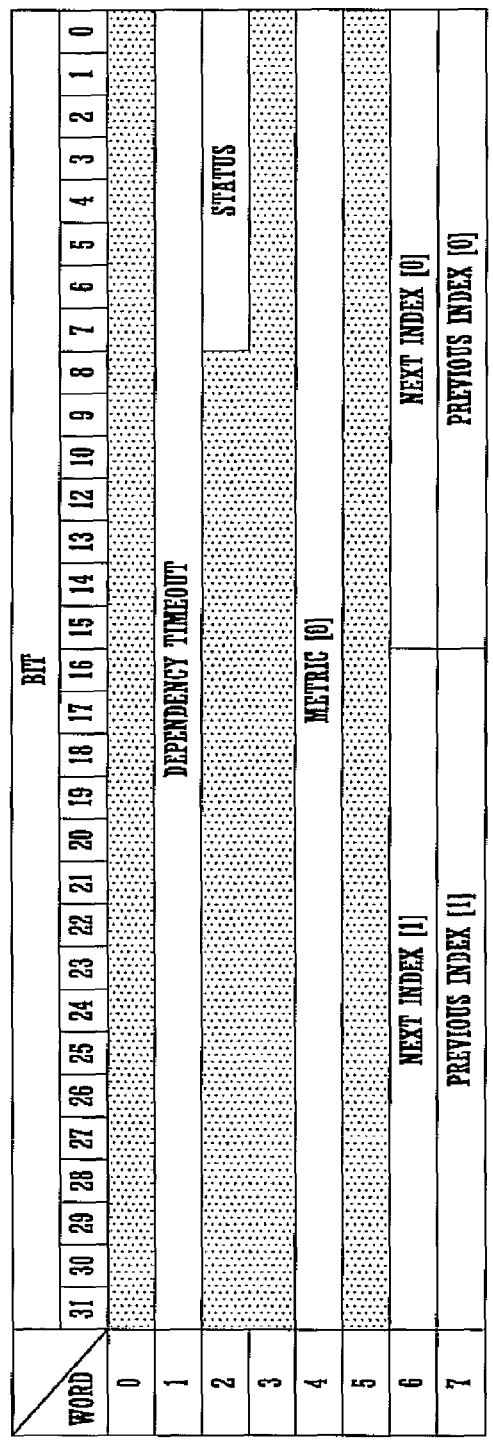

An alternative is a skip node descriptor and one example of this is shown in FIG. 9k, along with its associated fields (FIG. 9l). The skip node descriptor may periodically be inserted into the pending and timer queue structures according to a predefined metric. Skip node descriptors are inserted according to a defined maximum observed number of thread descriptors between skip node descriptors or participating thread descriptors. Skip node descriptors may simultaneously form a part of a pending queue and a timer queue skip list.

Each new dependant thread must be inserted according to its priority. The process will typically commence by traversing the skip list until the new thread's priority is higher than that of the skip list node. Thereafter, the search will continue, from that skip list node, on a thread descriptor by thread descriptor basis until the correct insertion point is found. This enables the otherwise linear search to skip blocks of pending threads when homing in on the correct insertion point for a new dependant thread.

Synchronisation events have three distinct types:

Unicast: The synchronisation event triggers a state transition on the first (highest priority) appropriate dependant thread found in the specified pending queue.

Multicast: The synchronisation event triggers state transitions on all appropriate dependant threads in the specified pending queue.

Broadcast: The synchronisation event triggers state transitions on all appropriate dependant threads in all pending queues.

Pending queues are defined by pending queue descriptors, as shown in FIGS. 9*i* and 9*j*. Pending queue descriptors are configured once during system initialisation and consume a single controller memory element 195. Pending queues only contain dependant thread descriptors and skip list nodes.

Timer Queue Structure

Figure 15:
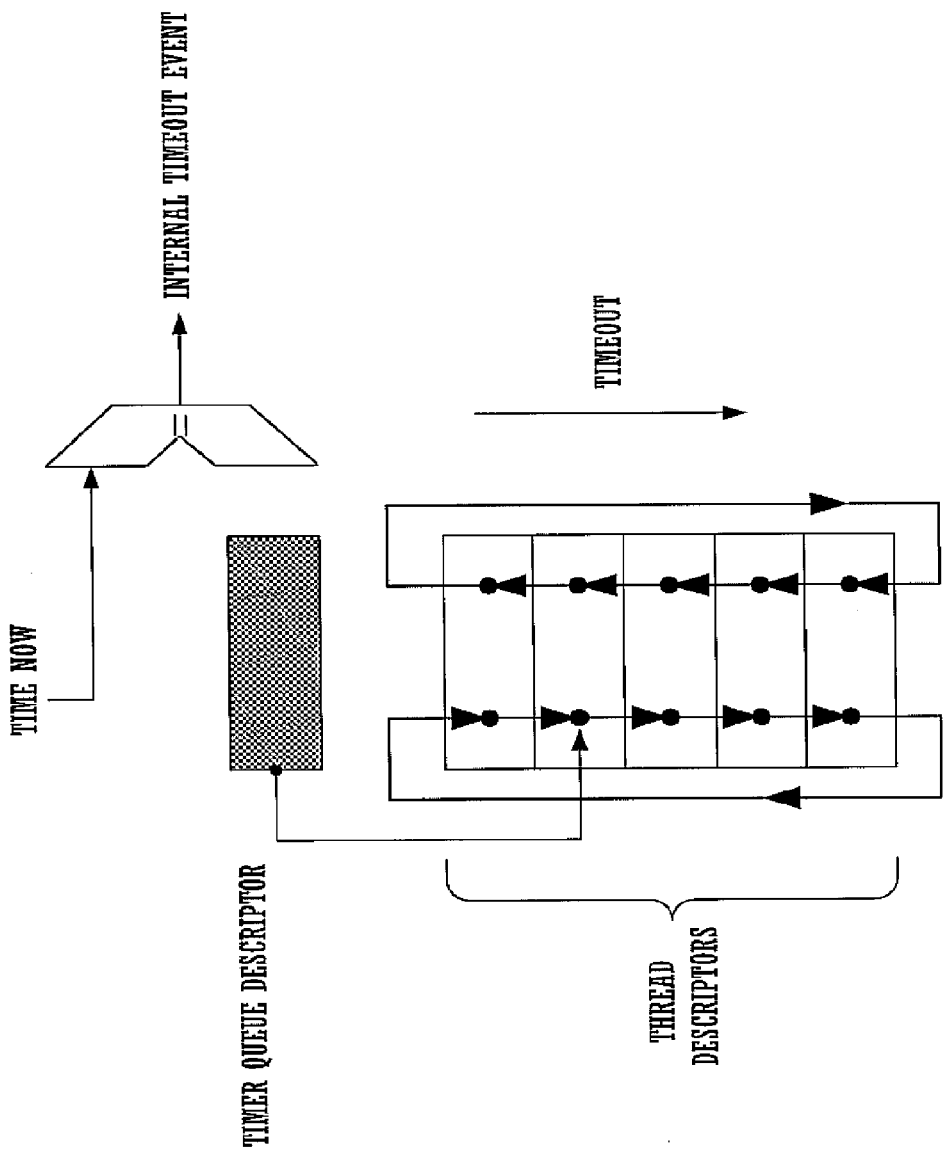
FIG. 15 shows a typical timer queue.

A single system wide timer queue is provided, which stores thread descriptors awaiting a timeout event. FIG. 15 shows an exemplary embodiment of a timer queue.

Skip lists are also used to expedite the insertion of threads into the timer queue structure as described above. However, in this case it is threads that only have temporal dependency (if any) which are used for skip lists.

The timer queue descriptor is stored within registers, enabling a concurrent compare to proceed between the head of the timer queue and the current time. This greatly reduces the impact of timer ticks on memory bandwidth.

Ready Queue Structures

Ready queue structures hold threads that are ready for execution. These threads were created with independent thread primitives, or they have received the synchronisation primitive upon which they were dependant. Synchronised threads have previously transitioned from a pending queue structure.

The Ready queue structures may contain scheduler node descriptors and independent and synchronised thread descriptors. The structure is largely defined during system initialisation although thread descriptors and dynamic scheduler tier descriptors are allowed to come and go in real time.

Ready queues may schedule threads to a specific processing resource 150, or a pool of processing resources 150. This enables load balancing across multiple processing resources 150 whilst maintaining the ability to target specific tasks at specific processing resources 150, for example hardware accelerators or IO devices.

Figure 16:
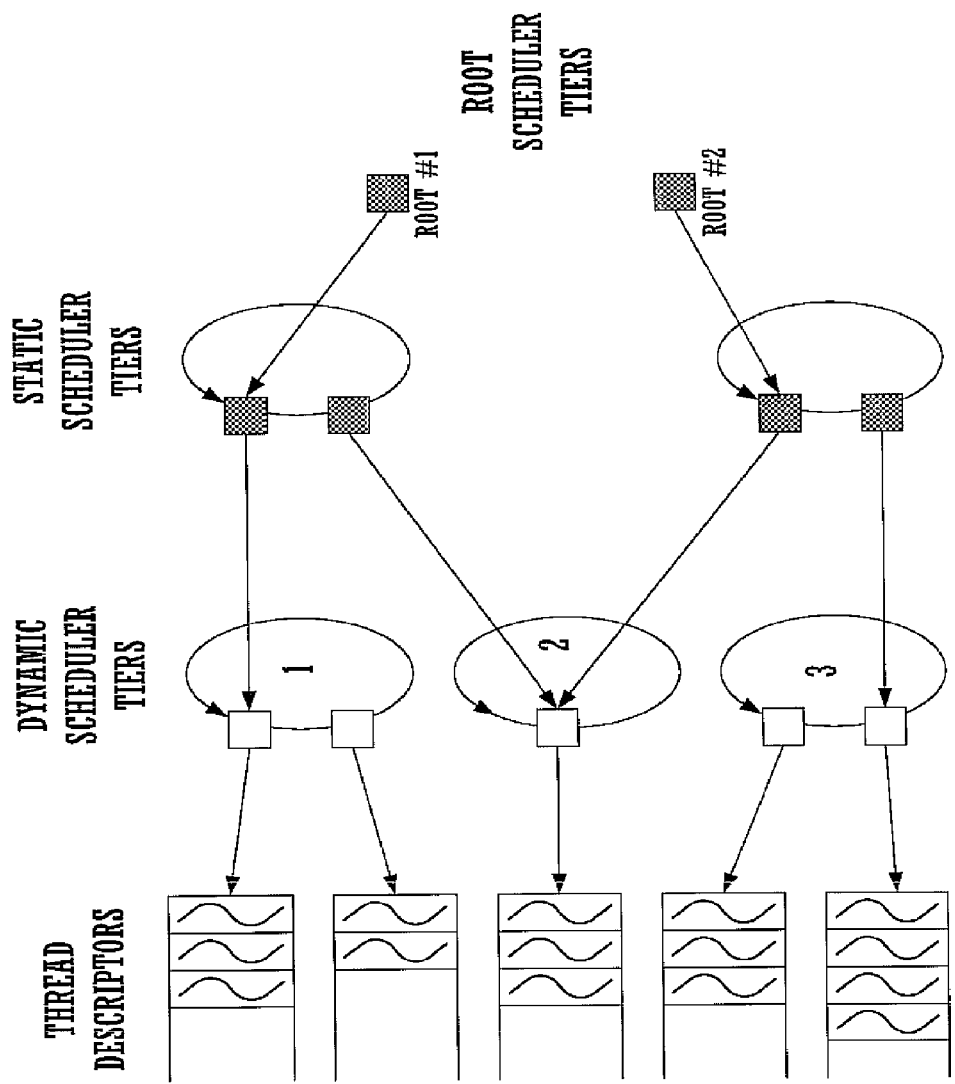
FIG. 16 shows a typical Ready queue structure for two processing resources.

FIG. 16 shows a typical Ready queue structure for two processing resources 150. Note that dynamic scheduler tier 2 is available to both root scheduler tiers. This enables the system management controller 130 to load balance threads beneath dynamic tier 2 between the processing resources 150 associated with root tiers 1 and 2.

Scheduler Tiers

Scheduler tiers define the hierarchy used to schedule thread descriptors. Each scheduler tier typically defines a scheduling algorithm, some metrics used to determine scheduling decisions and a list of child elements that may be further scheduler tiers or thread descriptors. There are three types of scheduler tier descriptor; root, static and dynamic. The format of scheduler tier memory elements is shown in FIGS. 9*e* and 9*f*.

Root scheduler descriptors have a one-to-one mapping with dispatch queues. They represent the ultimate node in the Ready queue structure. Since root tiers neither have parents nor sibling nodes with which to compete, it is not necessary to specify scheduling metrics for root descriptors. Scheduler root descriptors are configured during system initialisation and exist in perpetuity.

Static Scheduler Descriptor exist beneath root nodes in the scheduling hierarchy. The parents of static scheduler descriptors may be other static scheduler descriptors or root descriptors. They compete with sibling nodes according to their parents' defined scheduler algorithm and their scheduler metrics. Static scheduler descriptors are configured during system initialisation and exist in perpetuity. During operation, the system management controller 130 maintains the scheduler metrics according to the selected scheduling algorithm, for example Round Robin scheduling.

Dynamic Scheduler Descriptors exist beneath root and possibly static nodes in the scheduling hierarchy. The parents of dynamic scheduler descriptors may be either static scheduler descriptors or root descriptors. They compete with sibling nodes according to their parents' defined scheduler algorithm and their own scheduler metrics. Dynamic Scheduler descriptors may be configured at any time and may be retired under specific circumstances. This enables the system to support a far higher number of scheduling tiers than would be possible with a purely static provision. The system management controller 130 achieves this by capitalising on the likelihood that, although over all time a large number and diversity of threads and dynamic scheduler tiers are used, during a finite period, the transient demand is smaller. For example, in a networking system with attached memory supporting a maximum of 4000 dynamic elements (threads and dynamic scheduler descriptors) it may be possible to support 16000 connections as at any instant in time, dataunits from only a fraction of the overall connection space will be resident in the controller. This flexibility is achieved with a small penalty in performance, since, if a dynamic scheduler descriptor is not present, it must be created prior to the addition of child thread descriptors.

During operation, the system management controller 130 maintains the scheduler metrics according to the selected scheduling algorithm. Under certain circumstances the dynamic scheduler descriptors will be released back to the controller memory element 195 free list. This is achieved by storing the pReference from the last thread to be processed within that tier within the dynamic scheduler tier descriptor. The controller 130 API supports the interrogation of controller memory elements 195 to determine whether a dynamic scheduler descriptor has persisted between subsequent similar threads.

Dispatch Queues

Dispatch queues hold scheduled thread descriptors in a First In First Out (FIFO) queue awaiting service from the associated processing resource 150. A maximum of 32 dispatch queues are allowed, in the currently preferred embodiment. Dispatch queues are defined by dispatch queue descriptors, shown in FIGS. 9g and 9h. Dispatch queue descriptors are configured during system initialisation.

The process of transitioning a thread descriptor from a Ready queue structure to a dispatch queue structure is performed in hardware and requires no controller 130 API interaction.

Figure 17:
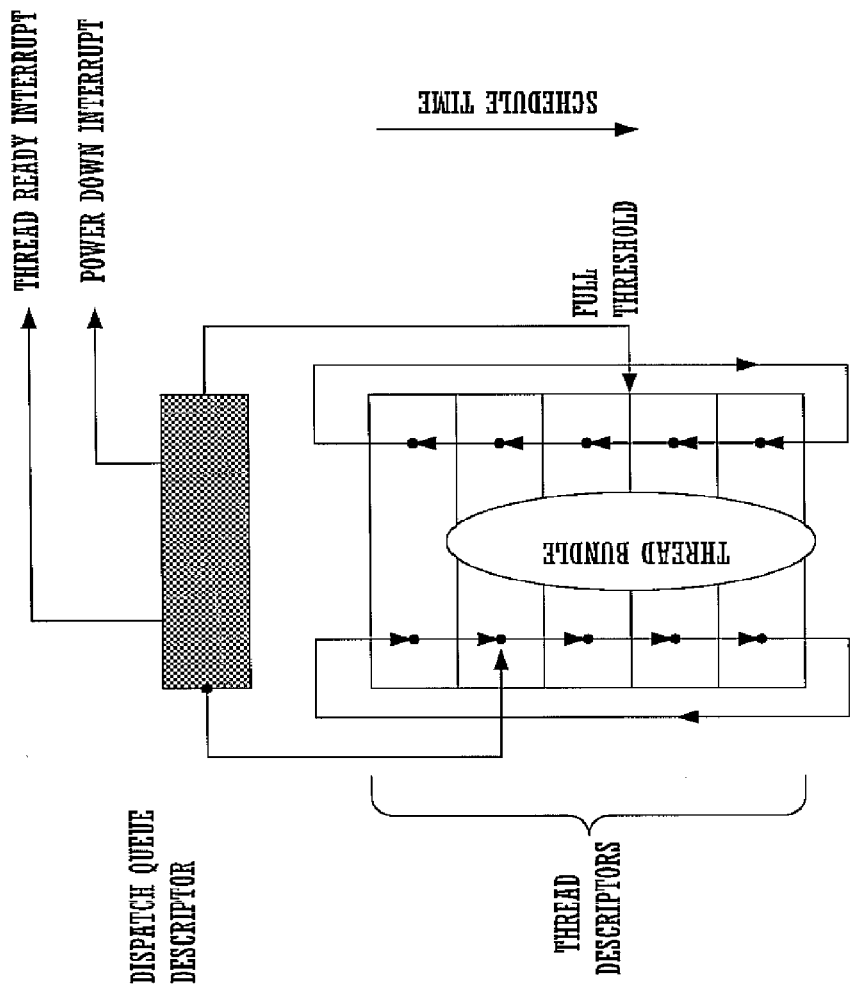
FIG. 17 shows an exemplary embodiment of a typical single dispatch queue structure.

FIG. 17 shows an exemplary embodiment of a typical single dispatch queue structure embodying features of the present invention. The Dispatch queue descriptor defines a full threshold. A dispatch queue length is only allowed to exceed the full threshold where a thread bundle is being scheduled or a pre-empted thread push is taking place.

Elements are removed from the dispatch queue via a pop operation called through the controller 130 API by a processing resource.

A priority field is included in the dispatch queue descriptor. When a thread is popped from the dispatch queue, the priority field is populated with the priority of the now-executing thread. A further API call enables the priority to be reset to another value by the executing processor, in order to avoid priority inversions. Priority inversion involves at least 3 threads of differing priority and describes a conflict between synchronisation and scheduling requirements. Priority inversion allows a lower priority thread to block a higher priority thread indefinitely. For example, a low priority thread locks a shared resource, and is then pre-empted by a higher priority thread. The higher priority thread then blocks on the resource that is locked by the low priority thread. Since the high priority thread is now blocked, normally the low priority thread would resume, were it not for the third medium thread, which is independent of the locked resource and is now free to run. The low priority thread never gets the opportunity to unlock the shared resource and therefore the high priority thread is blocked indefinitely. "Priority ceiling" protocol means that while a thread owns a shared resource, it runs at a specified priority. This ensures that the "low" priority thread as defined above, assumes a "high" priority whilst it owns the resource shared with the high priority thread.

Thread bundles describe a group of thread descriptors that originate from the same scheduler tier. A parameter is present in each scheduler descriptor defining the number of threads that may be transitioned from that tier of the ready queue to the dispatch queue before the scheduling decision is forced to update. By making use of this capability, and arranging that members of scheduler tiers share commonality, the processing resources 150 can be presented with blocks of threads that exhibit significantly higher cache locality than would otherwise be observed, resulting in a reduction in cache-misses and an increase in system performance.

Figure 18:
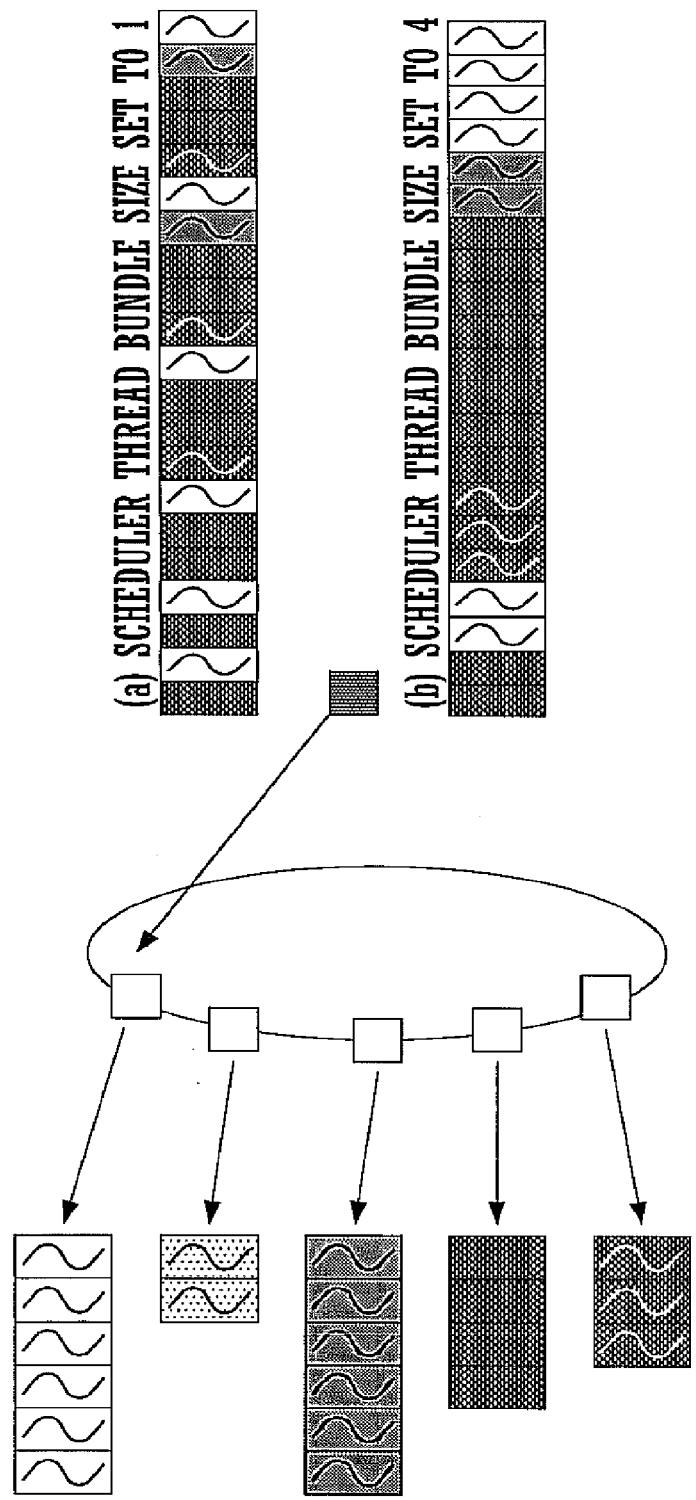
FIG. 18 shows a two tier scheduling hierarchy, including thread bundling.

FIG. 18 shows an exemplary two tier scheduling hierarchy, including thread bundling, according to an embodiment of the invention. The tier furthest from the root tier, the child tier, is using a FIFO scheduling algorithm. The root tier scheduler algorithm is configured as a round robin. In the embodiment, elements within each of the FIFO queues exhibit high levels of cache locality with other members of the same queue.

FIG. 18(a) shows the scheduling results where the child tiers thread bundle limit is set to 1. The results are perfectly interleaved. This scheme presents minimum latency to each queue; however, it is the least memory conscious (i.e. the most likely to exhibit poor cache performance). Context switches are necessary after each scheduled thread. Should the root tier be associated with a processing resource 150 that uses caches, compulsory cache misses could impact system performance.

FIG. 18(b) shows the scheduling results where the child tiers thread bundle limit is set to 4. The scheduler exhibits a courser grain update characteristic, which manifests itself as blocks of threads being scheduled from the same queues with a limit set by the thread bundle limit. Although this bursty behaviour may not be ideal in some circumstances, it exhibits a far better cache performance, as contexts switches are required comparatively infrequently. The resultant effect emulates the superior cache performance of a coarse grain multithreading whilst maintaining the superior programming model of the fine-grained approach.

It is likely that the bursty nature of thread bundling will be most undesirable where the system interacts with the outside world. However, thread bundling is only a benefit where the target processing resource 150 uses caches, therefore specialist processing resources 150, that interact with the outside world, for example an IO device, are unlikely to use cache technology and therefore will not make use of thread bundling.

Returning to FIG. 17, elements are removed from the dispatch queue via a pop operation called through the controller 130 API by a processing resource 150. Elements may be pushed back onto the head of the dispatch queue in the event of pre-emption.

A priority field is included in the dispatch queue descriptor that enables implementation of the priority ceiling protocol, preventing priority inversions with shared data. Each processing resource 150 has a unique dispatch queue.

Scheduling

The requirements of scheduling for applications and systems vary widely and, indeed, may only become clear after testing in real operating environments. To accommodate this, the system management controller 130 delivers flexibility in both scheduling policy and the scheduling algorithms used, which may be modified and tuned throughout the multicore processor design phase.

Scheduling policies may be split into three types:

1. A cooperative scheduler relies on currently executing tasks to release the processing resource 150 prior to scheduling a new one. Although this type of system is consistent with minimisation of cold-cache effects (e.g. where the cache local to the processing resource 150 does not contain the required instruction, therefore must load the missing instruction in from a slower higher level memory), and fixed-function hardware accelerators it may not be suitable for more complex embedded applications.

2. A static priority-driven scheduler can pre-empt the currently executing task in order to execute a task of higher priority. The highest priority ready thread is always the executing thread in these systems. The priority of any given task is fixed before the system begins execution.

3. A dynamic priority-driven scheduler can redefine priorities at run-time. As before, the currently running process is still of the highest priority, but the priority may have been changed since the task commenced execution.

The system management controller 130 caters for all three scheduling policies via appropriate configuration and run-time interaction with the target application.

The system management controller 130 supports many scheduling algorithms found within both the operating system and communications communities. For example, first in first out queuing, priority queuing or weighted fair queuing.

An appropriate choice of scheduling algorithm will exhibit demonstrable advantages, particularly where subjective quality metrics are involved.

Two scheduler metrics are provided within thread descriptors to support the scheduling behaviour within the system management controller 130. The first represents the priority of the thread in all cases and is used within a pending queue structure, priority based schedulers and a dispatch queue structure. Where necessary, the second is used to select between the individual thread and its peers. Furthermore either metric may be used to update metrics within the parent descriptor. The value placed within the second primitive of a thread descriptor must reflect the types of scheduling encountered in its scheduler hierarchy.

These two scheduler metrics are used in both the scheduler descriptors, and the thread descriptors. However, although thread metrics are calculated within the processing resources 150, this is not possible for scheduler tiers. Subsequently, sufficient parameters must be passed from a given tier's scheduled thread to enable the scheduler tier to update its own metric. A set of instructions is defined for each scheduler tier which define how the metrics are propagated from child to parent.

With some attention to the overall scheduler hierarchy, complex combinations of scheduler algorithms may be easily created to provide sophisticated traffic and task management capabilities in application systems.

Parameter Inheritance Example

Figure 19:
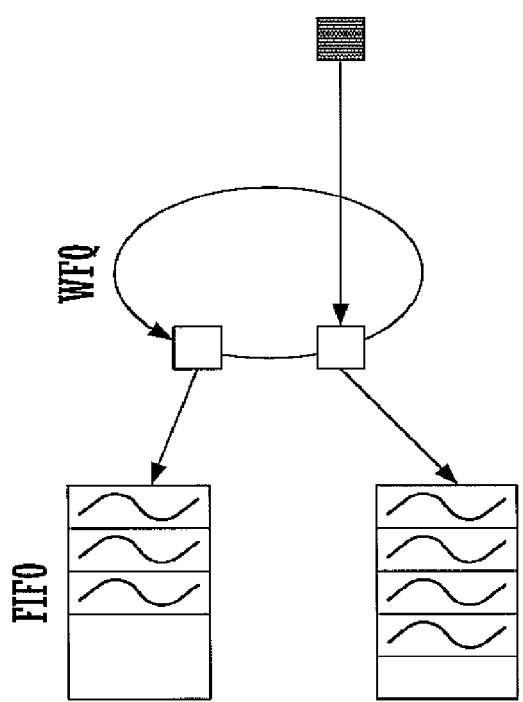
FIG. 19 shows an exemplary simplified queue structure that might commonly be found in a communications system.

FIG. 19 shows an exemplary embodiment of a simplified queue structure that might commonly be found in a communications system. The structure represents an output queue for an IO device. All threads sharing a FIFO queue are on the same connection, so this is a per connection queuing structure. The second scheduling tier uses a weighted fair queuing (WFQ) algorithm in this example. This algorithm calculates the finish time of a given task based on its length and a weighting factor. It then selects the packet with the earliest finish time. Although WFQ is reliant on knowledge of the length of the packet that the thread represents, the initial FIFO queue is independent of this information. In this case, the application programmer must ensure that the length of the packet is present in the scheduler metrics for each thread. Scheduler tiers higher in the hierarchy inherit this parameter for their own scheduling algorithms.

For WFQ the following variables are required:
P—Fraction of pipe bandwidth allocated to the connection
l—Length of packet
B—Overall pipe bandwidth
c—Connection bandwidth
d—Scheduler tier deadline The equation for calculating the connection bandwidth, c, is:

$$P*B=c$$

If we normalise the channel to a bandwidth of 1, then p becomes equal to c. The finish time of the processing of the packet, t, is then given by:

$$\frac{1}{p}*l=t$$

The metrics required are then 1/p and l. Since p was originally a fraction, both (1/p and l) of these values are integers. The length of the scheduled packet is passed up through the scheduler hierarchy, progressively updating the tier's deadline. In full, the calculation performed within each update is:

$$d=d+\left(\frac{1}{p}*l\right)$$

Where d and 1/p (the weight) are stored within the scheduler tier descriptor and l is passed through the hierarchy during a schedule update. This calculation is performed within the scheduler manager 330.

Whilst a specific embodiment of the invention has been described, it is to be understood that this is by way of example only and that various modifications may be considered. Moreover, the invention is of general application in any device or application that employs a multicore processor, such as, but not limited to, a mobile telephone or voice over Internet Protocol (VoIP) for example. Therefore, the specific embodiment is not to be seen as limiting of the scope of protection which is to be determined by the following claims.

The invention claimed is:

1. A method of handling an external interrupt in a multicore processor chip, the method comprising:
   identifying, by a system management controller, an interrupt service thread in an initial queue, the initial queue comprising threads awaiting for execution upon occurrence of an event, wherein the multicore processor chip comprises a single integrated chip that includes the system management controller, the initial queue, a ready queue, a plurality of processor elements, and a plurality of dispatch queues each corresponding to the respective processor element within the single integrated chip;
   receiving, by the system management controller, an external interrupt from outside the multicore processor chip; and
   allocating, by the system management controller, the interrupt service thread to a most available processor element of the plurality of processor elements in response to the received external interrupt by moving the interrupt service thread from the initial queue to the ready queue and from the ready queue to the dispatch queue corresponding to the allocated processor element, wherein the ready queue determines the dispatch queue to which the interrupt service thread is to be allocated, and wherein the interrupt service thread is prioritized for execution in comparison with any other threads in the dispatch queue.

2. The method of claim 1, wherein the initial queue is a pending queue and wherein allocating the interrupt service thread to the most available processor element of the plurality of processor elements comprises generating a synchronization primitive by the system management controller.

3. The method of claim 1, wherein the initial queue is a timer queue, wherein the interrupt service thread is configured in response to the received external interrupt, and wherein allocating the interrupt service thread to the most available processor element of the plurality of processor elements occurs at a specified time after configuring the interrupt service thread.

4. The method of claim 1, further comprising:
   identifying a second thread in the initial queue of the multicore processor chip; and allocating the second thread to a second processor element of the plurality of processor elements independently from any received external interrupt by moving the second thread from the initial queue to the dispatch queue corresponding to the allocated second processor element.

5. The method of claim 1, wherein the received external interrupt is a system interrupt.

6. The method of claim 1, further comprising:
scheduling a timing of execution or an order of execution of any threads in the dispatch queue on the basis of a plurality of scheduling rules.

7. The method of claim 1, wherein the system management controller comprises an interrupt manager configured to allocate the interrupt service thread to one of the plurality of processor elements.

8. The method of claim 7, wherein the system management controller further comprises a transaction manager configured to maintain the initial queue, the ready queue, and the dispatch queue, and wherein the interrupt manager is further configured to convert external interrupts received in a first format employed by the multicore processor chip into a second format employed by the transaction manager.

9. A multicore processor chip comprising:
a single integrated chip;
a plurality of processor elements located within the single integrated chip; and
a system management controller located within the single integrated chip and communicatively coupled to the plurality of processor elements, comprising:
an initial queue comprising threads awaiting for execution upon occurrence of an event;
a ready queue;
an input configured to receive an external interrupt from outside the multicore processor chip; and
a plurality of dispatch queues, each dispatch queue corresponding to a different processor element of the plurality of processor elements;
wherein the system management controller identifies an interrupt service thread in the initial queue and allocates the interrupt service thread to a most available processor element of the plurality of processor elements in response to receiving an external interrupt by moving the interrupt service thread from the initial queue to the ready queue and from the ready queue to the dispatch queue corresponding to the allocated processor element, wherein the ready queue determines the dispatch queue to which the interrupt service thread is to be allocated, and wherein the interrupt service thread is prioritized for execution in comparison with any other threads in the dispatch queue.

10. The multicore processor chip of claim 9, wherein the initial queue is a pending queue and wherein the system management controller allocates the interrupt service thread to the most available processor element of the plurality of processor elements by generating a synchronization primitive.

11. The multicore processor chip of claim 9, wherein the initial queue is a timer queue, wherein the system management controller configures the interrupt service thread in response to receiving an external interrupt, and wherein the system management controller further allocates the interrupt service thread to the most available processor element of the plurality of processor elements at a specified time after configuring the interrupt service thread.

12. The multicore processor chip of claim 9, wherein the system management controller identifies a second thread in the initial queue and allocates the second thread to a second processor element of the plurality of processor elements independently from any received external interrupt by moving the second thread from the initial queue to a dispatch queue corresponding to the allocated second processor element.

13. The multicore processor chip of claim 9, wherein the received external interrupt is a system interrupt.

14. The multicore processor chip of claim 9, wherein the system management controller schedules a timing of execution or an order of execution by the processor elements of any threads in the dispatch queue on the basis of a plurality of scheduling rules.

15. The multicore processor chip of claim 9, further comprising an interrupt manager configured to allocate the interrupt service thread to one of the plurality of processor elements.

16. The multicore processor chip of claim 15, further comprising a transaction manager configured to maintain the initial queue, the ready queue, and the dispatch queue, and wherein the interrupt manager is further configured to convert external interrupts received in a first format employed by the multicore processor chip into a second format employed by the transaction manager.

* * * * *